(12) United States Patent
Yeung et al.

(10) Patent No.: US 11,898,504 B2
(45) Date of Patent: *Feb. 13, 2024

(54) SYSTEMS AND METHODS UTILIZING TURBINE COMPRESSOR DISCHARGE FOR HYDROSTATIC MANIFOLD PURGE

(71) Applicant: BJ Energy Solutions, LLC, Houston, TX (US)

(72) Inventors: Tony Yeung, Tomball, TX (US); Ricardo Rodriguez-Ramon, Tomball, TX (US); Joseph Foster, Tomball, TX (US)

(73) Assignee: BJ Energy Solutions, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/132,066

(22) Filed: Dec. 23, 2020

(65) Prior Publication Data

US 2021/0355883 A1 Nov. 18, 2021

Related U.S. Application Data

(62) Division of application No. 15/929,770, filed on May 21, 2020, now Pat. No. 10,968,837.

(Continued)

(51) Int. Cl.
*F02C 9/00* (2006.01)
*F02C 9/40* (2006.01)
(Continued)

(52) U.S. Cl.
CPC ............ *F02C 9/40* (2013.01); *E21B 43/2607* (2020.05); *F02C 7/222* (2013.01); *F02C 7/232* (2013.01);
(Continued)

(58) Field of Classification Search
None
See application file for complete search history.

(56) References Cited

U.S. PATENT DOCUMENTS

| 1,716,049 A | 6/1929 | Greve |
| 1,726,633 A | 9/1929 | Smith |

(Continued)

FOREIGN PATENT DOCUMENTS

| AU | 9609498 | 7/1999 |
| AU | 737970 | 9/2001 |

(Continued)

OTHER PUBLICATIONS

US 11,459,865 B2, 10/2022, Cui et al. (withdrawn)
(Continued)

*Primary Examiner* — Edwin Kang
(74) *Attorney, Agent, or Firm* — Norton Rose Fulbright US LLP

(57) ABSTRACT

Embodiments of systems and methods for air recovery are disclosed. The diverted pressurized air may be used to supply a hydrostatic purge to the unutilized portion of a turbine engine fuel manifold circuit to ensure that exhaust gases from the utilized side of the fuel manifold circuit do not enter the portion of the alternative fuel manifold circuit rack. The assembly used to remove compressor section pressurized air may include a flow control orifice, line pressure measuring instrumentation, non-return valves, isolation valves and hard stainless-steel tubing assemblies. In some embodiments, a turbine compressor section diverter system may include a small air receiver used to increase the volume of air supplying the manifold to aid in potential pressure and flow disruptions from a turbine engine compressor section.

20 Claims, 9 Drawing Sheets

Related U.S. Application Data

(60) Provisional application No. 62/704,539, filed on May 14, 2020.

(51) Int. Cl.
*F02C 7/22* (2006.01)
*F02C 7/232* (2006.01)
*E21B 43/26* (2006.01)

(52) U.S. Cl.
CPC ...... *F05D 2210/11* (2013.01); *F05D 2210/12* (2013.01); *F05D 2220/32* (2013.01); *F05D 2240/35* (2013.01); *F05D 2240/40* (2013.01); *F05D 2260/60* (2013.01)

(56) References Cited

U.S. PATENT DOCUMENTS

| | | | |
|---|---|---|---|
| 2,178,662 A | 11/1939 | Lars | |
| 2,427,638 A | 9/1947 | Vilter | |
| 2,498,229 A | 2/1950 | Adler | |
| 2,535,703 A | 12/1950 | Smith et al. | |
| 2,572,711 A | 10/1951 | Fischer | |
| 2,820,341 A | 1/1958 | Amann | |
| 2,868,004 A | 1/1959 | Runde | |
| 2,940,377 A | 6/1960 | Darnell et al. | |
| 2,947,141 A * | 8/1960 | Russ | F02C 9/32 60/39.281 |
| 2,956,738 A | 10/1960 | Rosenschold | |
| 3,068,796 A | 12/1962 | Pfluger et al. | |
| 3,191,517 A | 6/1965 | Solzman | |
| 3,257,031 A | 6/1966 | Dietz | |
| 3,274,768 A | 9/1966 | Klein | |
| 3,378,074 A | 4/1968 | Kiel | |
| 3,382,671 A | 5/1968 | Ehni, III | |
| 3,401,873 A | 9/1968 | Privon | |
| 3,463,612 A | 8/1969 | Whitsel | |
| 3,496,880 A | 2/1970 | Wolff | |
| 3,550,696 A | 12/1970 | Kenneday | |
| 3,560,053 A | 2/1971 | Ortloff | |
| 3,586,459 A | 6/1971 | Zerlauth | |
| 3,632,222 A | 1/1972 | Cronstedt | |
| 3,656,582 A | 4/1972 | Alcock | |
| 3,667,868 A | 6/1972 | Brunner | |
| 3,692,434 A | 9/1972 | Schnear | |
| 3,739,872 A | 6/1973 | McNair | |
| 3,757,581 A | 9/1973 | Mankin | |
| 3,759,063 A | 9/1973 | Bendall | |
| 3,765,173 A | 10/1973 | Harris | |
| 3,771,916 A | 11/1973 | Flanigan et al. | |
| 3,773,438 A | 11/1973 | Hall et al. | |
| 3,781,135 A | 12/1973 | Nickell | |
| 3,786,835 A | 1/1974 | Finger | |
| 3,791,682 A | 2/1974 | Mitchell | |
| 3,796,045 A | 3/1974 | Foster | |
| 3,814,549 A | 6/1974 | Cronstedt | |
| 3,820,922 A | 6/1974 | Buse et al. | |
| 3,847,511 A | 11/1974 | Cole | |
| 3,866,108 A | 2/1975 | Yannone | |
| 3,875,380 A | 4/1975 | Rankin | |
| 3,963,372 A | 6/1976 | McLain et al. | |
| 4,010,613 A | 3/1977 | McInerney | |
| 4,019,477 A | 4/1977 | Overton | |
| 4,031,407 A | 6/1977 | Reed | |
| 4,050,862 A | 9/1977 | Buse | |
| 4,059,045 A | 11/1977 | McClain | |
| 4,086,976 A | 5/1978 | Holm et al. | |
| 4,117,342 A | 9/1978 | Melley, Jr. | |
| 4,173,121 A | 11/1979 | Yu | |
| 4,204,808 A | 5/1980 | Reese et al. | |
| 4,209,079 A | 6/1980 | Marchal et al. | |
| 4,209,979 A | 7/1980 | Woodhouse et al. | |
| 4,222,229 A | 9/1980 | Uram | |
| 4,239,396 A | 12/1980 | Arribau et al. | |
| 4,269,569 A | 5/1981 | Hoover | |
| 4,311,395 A | 1/1982 | Douthitt et al. | |
| 4,330,237 A | 5/1982 | Battah | |
| 4,341,508 A | 7/1982 | Rambin, Jr. | |
| 4,357,027 A | 11/1982 | Zeitlow | |
| 4,383,478 A | 5/1983 | Jones | |
| 4,402,504 A | 9/1983 | Christian | |
| 4,430,047 A | 2/1984 | Ilg | |
| 4,442,665 A | 4/1984 | Fick | |
| 4,457,325 A | 7/1984 | Green | |
| 4,470,771 A | 9/1984 | Hall et al. | |
| 4,483,684 A | 11/1984 | Black | |
| 4,505,650 A | 3/1985 | Hannett et al. | |
| 4,574,880 A | 3/1986 | Handke | |
| 4,584,654 A | 4/1986 | Crane | |
| 4,620,330 A | 11/1986 | Izzi, Sr. | |
| 4,672,813 A * | 6/1987 | David | F01B 3/0079 384/111 |
| 4,754,607 A | 7/1988 | Mackay | |
| 4,782,244 A | 11/1988 | Wakimoto | |
| 4,796,777 A | 1/1989 | Keller | |
| 4,869,209 A | 9/1989 | Young | |
| 4,913,625 A | 4/1990 | Gerlowski | |
| 4,983,259 A | 1/1991 | Duncan | |
| 4,990,058 A | 2/1991 | Eslinger | |
| 5,032,065 A | 7/1991 | Yamamuro | |
| 5,135,361 A | 8/1992 | Dion | |
| 5,167,493 A | 12/1992 | Kobari | |
| 5,245,970 A | 9/1993 | Iwaszkiewicz et al. | |
| 5,291,842 A | 3/1994 | Sallstrom et al. | |
| 5,326,231 A | 7/1994 | Pandeya | |
| 5,362,219 A | 11/1994 | Paul et al. | |
| 5,511,956 A | 4/1996 | Hasegawa | |
| 5,537,813 A | 7/1996 | Davis et al. | |
| 5,553,514 A | 9/1996 | Walkowc | |
| 5,560,195 A | 10/1996 | Anderson et al. | |
| 5,586,444 A | 12/1996 | Fung | |
| 5,622,245 A | 4/1997 | Reik | |
| 5,626,103 A | 5/1997 | Haws et al. | |
| 5,634,777 A | 6/1997 | Albertin | |
| 5,651,400 A | 7/1997 | Corts et al. | |
| 5,678,460 A | 10/1997 | Walkowc | |
| 5,717,172 A | 2/1998 | Griffin, Jr. et al. | |
| 5,720,598 A | 2/1998 | de Chizzelle | |
| 5,761,084 A | 6/1998 | Edwards | |
| 5,811,676 A | 9/1998 | Spalding et al. | |
| 5,839,888 A | 11/1998 | Harrison | |
| 5,846,062 A | 12/1998 | Yanagisawa et al. | |
| 5,875,744 A | 3/1999 | Vallejos | |
| 5,983,962 A | 11/1999 | Gerardot | |
| 5,992,944 A | 11/1999 | Hara | |
| 6,041,856 A | 3/2000 | Thrasher et al. | |
| 6,050,080 A | 4/2000 | Horner | |
| 6,067,962 A | 5/2000 | Bartley et al. | |
| 6,071,188 A | 6/2000 | O'Neill et al. | |
| 6,074,170 A | 6/2000 | Bert et al. | |
| 6,123,751 A | 9/2000 | Nelson et al. | |
| 6,129,335 A | 10/2000 | Yokogi | |
| 6,145,318 A | 11/2000 | Kaplan et al. | |
| 6,230,481 B1 | 5/2001 | Jahr | |
| 6,279,309 B1 | 8/2001 | Lawlor, II et al. | |
| 6,321,860 B1 | 11/2001 | Reddoch | |
| 6,334,746 B1 | 1/2002 | Nguyen et al. | |
| 6,401,472 B2 | 6/2002 | Pollrich | |
| 6,530,224 B1 | 3/2003 | Conchieri | |
| 6,543,395 B2 | 4/2003 | Green | |
| 6,655,922 B1 | 12/2003 | Flek | |
| 6,669,453 B1 | 12/2003 | Breeden | |
| 6,765,304 B2 | 7/2004 | Baten et al. | |
| 6,786,051 B2 | 9/2004 | Kristich et al. | |
| 6,832,900 B2 | 12/2004 | Leu | |
| 6,851,514 B2 | 2/2005 | Han et al. | |
| 6,859,740 B2 | 2/2005 | Stephenson et al. | |
| 6,901,735 B2 | 6/2005 | Lohn | |
| 6,962,057 B2 | 11/2005 | Kurokawa et al. | |
| 7,007,966 B2 | 3/2006 | Campion | |
| 7,047,747 B2 | 5/2006 | Tanaka | |
| 7,065,953 B1 | 6/2006 | Kopko | |
| 7,143,016 B1 | 11/2006 | Discenzo et al. | |
| 7,222,015 B2 | 5/2007 | Davis et al. | |

(56) References Cited

U.S. PATENT DOCUMENTS

| | | |
|---|---|---|
| 7,281,519 B2 | 10/2007 | Schroeder |
| 7,388,303 B2 | 6/2008 | Seiver |
| 7,404,294 B2 | 7/2008 | Sundin |
| 7,442,239 B2 | 10/2008 | Armstrong et al. |
| 7,524,173 B2 | 4/2009 | Cummins |
| 7,545,130 B2 | 6/2009 | Latham |
| 7,552,903 B2 | 6/2009 | Dunn et al. |
| 7,563,076 B2 | 7/2009 | Brunet et al. |
| 7,563,413 B2 | 7/2009 | Naets et al. |
| 7,574,325 B2 | 8/2009 | Dykstra |
| 7,581,379 B2 | 9/2009 | Yoshida et al. |
| 7,594,424 B2 | 9/2009 | Fazekas |
| 7,614,239 B2 | 11/2009 | Herzog et al. |
| 7,627,416 B2 | 12/2009 | Batenburg et al. |
| 7,677,316 B2 | 3/2010 | Butler et al. |
| 7,721,521 B2 | 5/2010 | Kunkle et al. |
| 7,730,711 B2 | 6/2010 | Kunkle et al. |
| 7,779,961 B2 | 8/2010 | Matte |
| 7,789,452 B2 | 9/2010 | Dempsey et al. |
| 7,836,949 B2 | 11/2010 | Dykstra |
| 7,841,394 B2 | 11/2010 | McNeel et al. |
| 7,845,413 B2 | 12/2010 | Shampine et al. |
| 7,861,679 B2 | 1/2011 | Lemke et al. |
| 7,886,702 B2 | 2/2011 | Jerrell et al. |
| 7,900,724 B2 | 3/2011 | Promersberger et al. |
| 7,921,914 B2 | 4/2011 | Bruins et al. |
| 7,938,151 B2 | 5/2011 | Höckner |
| 7,955,056 B2 | 6/2011 | Pettersson |
| 7,980,357 B2 | 7/2011 | Edwards |
| 8,056,635 B2 | 11/2011 | Shampine et al. |
| 8,083,504 B2 | 12/2011 | Williams et al. |
| 8,099,942 B2 | 1/2012 | Alexander |
| 8,186,334 B2 | 5/2012 | Ooyama |
| 8,196,555 B2 | 6/2012 | Ikeda et al. |
| 8,202,354 B2 | 6/2012 | Iijima |
| 8,316,936 B2 | 11/2012 | Roddy et al. |
| 8,336,631 B2 | 12/2012 | Shampine et al. |
| 8,388,317 B2 | 3/2013 | Sung |
| 8,414,673 B2 | 4/2013 | Raje et al. |
| 8,469,826 B2 | 6/2013 | Brosowske |
| 8,500,215 B2 | 8/2013 | Gastauer |
| 8,506,267 B2 | 8/2013 | Gambier et al. |
| 8,575,873 B2 | 11/2013 | Peterson et al. |
| 8,616,005 B1 | 12/2013 | Cousino, Sr. et al. |
| 8,621,873 B2 | 1/2014 | Robertson et al. |
| 8,641,399 B2 | 2/2014 | Mucibabic |
| 8,656,990 B2 | 2/2014 | Kajaria et al. |
| 8,672,606 B2 | 3/2014 | Glynn et al. |
| 8,707,853 B1 | 4/2014 | Dille et al. |
| 8,708,667 B2 | 4/2014 | Collingborn |
| 8,714,253 B2 | 5/2014 | Sherwood et al. |
| 8,757,918 B2 | 6/2014 | Ramnarain et al. |
| 8,763,583 B2 | 7/2014 | Hofbauer et al. |
| 8,770,329 B2 | 7/2014 | Spitler |
| 8,784,081 B1 | 7/2014 | Blume |
| 8,789,601 B2 | 7/2014 | Broussard et al. |
| 8,794,307 B2 | 8/2014 | Coquilleau et al. |
| 8,801,394 B2 | 8/2014 | Anderson |
| 8,851,186 B2 | 10/2014 | Shampine et al. |
| 8,851,441 B2 | 10/2014 | Acuna et al. |
| 8,894,356 B2 | 11/2014 | Lafontaine et al. |
| 8,905,056 B2 | 12/2014 | Kendrick |
| 8,951,019 B2 | 2/2015 | Hains et al. |
| 8,973,560 B2 | 3/2015 | Krug |
| 8,997,904 B2 | 4/2015 | Cryer et al. |
| 9,011,111 B2 | 4/2015 | Lesko |
| 9,016,383 B2 | 4/2015 | Shampine et al. |
| 9,032,620 B2 | 5/2015 | Frassinelli et al. |
| 9,057,247 B2 | 6/2015 | Kumar et al. |
| 9,097,249 B2 | 8/2015 | Petersen |
| 9,103,193 B2 | 8/2015 | Coli et al. |
| 9,121,257 B2 | 9/2015 | Coli et al. |
| 9,140,110 B2 | 9/2015 | Coli et al. |
| 9,175,810 B2 | 11/2015 | Hains |
| 9,187,982 B2 | 11/2015 | Dehring et al. |
| 9,206,667 B2 | 12/2015 | Khvoshchev et al. |
| 9,212,643 B2 | 12/2015 | Deliyski |
| 9,222,346 B1 | 12/2015 | Walls |
| 9,324,049 B2 | 4/2016 | Thomeer et al. |
| 9,341,055 B2 | 5/2016 | Weightman et al. |
| 9,346,662 B2 | 5/2016 | Van Vliet et al. |
| 9,366,114 B2 | 6/2016 | Coli et al. |
| 9,376,786 B2 | 6/2016 | Numasawa |
| 9,394,829 B2 | 7/2016 | Cabeen et al. |
| 9,395,049 B2 | 7/2016 | Vicknair et al. |
| 9,401,670 B2 | 7/2016 | Minato et al. |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,435,333 B2 | 9/2016 | McCoy et al. |
| 9,488,169 B2 | 11/2016 | Cochran et al. |
| 9,493,997 B2 | 11/2016 | Liu et al. |
| 9,512,783 B2 | 12/2016 | Veilleux et al. |
| 9,534,473 B2 | 1/2017 | Morris et al. |
| 9,546,652 B2 | 1/2017 | Yin |
| 9,550,501 B2 | 1/2017 | Ledbetter |
| 9,556,721 B2 | 1/2017 | Jang et al. |
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,593,710 B2 | 3/2017 | Laimboeck et al. |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,656,762 B2 | 5/2017 | Kamath et al. |
| 9,689,316 B1 | 6/2017 | Crom |
| 9,695,808 B2 | 7/2017 | Giessbach et al. |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Crom |
| 9,840,897 B2 | 12/2017 | Larson |
| 9,840,901 B2 | 12/2017 | Oehring et al. |
| 9,845,730 B2 | 12/2017 | Betti et al. |
| 9,850,422 B2 | 12/2017 | Lestz et al. |
| 9,856,131 B1 | 1/2018 | Moffitt |
| 9,863,279 B2 | 1/2018 | Laing et al. |
| 9,869,305 B1 | 1/2018 | Crowe et al. |
| 9,871,406 B1 | 1/2018 | Churnock et al. |
| 9,879,609 B1 | 1/2018 | Crowe et al. |
| RE46,725 E | 2/2018 | Case et al. |
| 9,893,500 B2 | 2/2018 | Oehring et al. |
| 9,893,660 B2 | 2/2018 | Peterson et al. |
| 9,897,003 B2 | 2/2018 | Motakef et al. |
| 9,920,615 B2 | 3/2018 | Zhang et al. |
| 9,945,365 B2 | 4/2018 | Hernandez et al. |
| 9,964,052 B2 | 5/2018 | Millican et al. |
| 9,970,278 B2 | 5/2018 | Broussard et al. |
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,008,912 B2 | 6/2018 | Davey et al. |
| 10,018,096 B2 | 7/2018 | Wallimann et al. |
| 10,020,711 B2 | 7/2018 | Oehring et al. |
| 10,024,123 B2 | 7/2018 | Steffenhagen et al. |
| 10,029,289 B2 | 7/2018 | Wendorski et al. |
| 10,030,579 B2 | 7/2018 | Austin et al. |
| 10,036,238 B2 | 7/2018 | Oehring |
| 10,040,541 B2 | 8/2018 | Wilson et al. |
| 10,060,293 B2 | 8/2018 | Del Bono |
| 10,060,349 B2 | 8/2018 | Álvarez et al. |
| 10,077,933 B2 | 9/2018 | Nelson et al. |
| 10,082,137 B2 | 9/2018 | Graham et al. |
| 10,094,366 B2 | 10/2018 | Marica |
| 10,100,827 B2 | 10/2018 | Devan et al. |
| 10,107,084 B2 | 10/2018 | Coli et al. |
| 10,107,085 B2 | 10/2018 | Coli et al. |

(56) References Cited

U.S. PATENT DOCUMENTS

| | | |
|---|---|---|
| 10,114,061 B2 | 10/2018 | Frampton et al. |
| 10,119,381 B2 | 11/2018 | Oehring et al. |
| 10,125,750 B2 | 11/2018 | Pfaff |
| 10,134,257 B2 | 11/2018 | Zhang et al. |
| 10,138,098 B2 | 11/2018 | Sorensen et al. |
| 10,151,244 B2 | 12/2018 | Giancotti et al. |
| 10,161,423 B2 | 12/2018 | Rampen |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,288,519 B2 | 5/2019 | De La Cruz |
| 10,303,190 B2 | 5/2019 | Shock |
| 10,305,350 B2 | 5/2019 | Johnson et al. |
| 10,316,832 B2 | 6/2019 | Byrne |
| 10,317,875 B2 | 6/2019 | Pandurangan et al. |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| RE47,695 E | 11/2019 | Case et al. |
| 10,465,689 B2 | 11/2019 | Crom |
| 10,478,753 B1 | 11/2019 | Elms et al. |
| 10,526,882 B2 | 1/2020 | Oehring et al. |
| 10,563,649 B2 | 2/2020 | Zhang et al. |
| 10,577,910 B2 | 3/2020 | Stephenson |
| 10,584,645 B2 | 3/2020 | Nakagawa et al. |
| 10,590,867 B2 | 3/2020 | Thomassin et al. |
| 10,598,258 B2 | 3/2020 | Oehring et al. |
| 10,610,842 B2 | 4/2020 | Chong |
| 10,662,749 B1 | 5/2020 | Hill et al. |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,760,556 B1 | 9/2020 | Crom et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,830,225 B2 | 11/2020 | Repaci |
| 10,859,203 B1 | 12/2020 | Cui et al. |
| 10,864,487 B1 | 12/2020 | Han et al. |
| 10,865,624 B1 | 12/2020 | Cui et al. |
| 10,865,631 B1 | 12/2020 | Zhang et al. |
| 10,870,093 B1 | 12/2020 | Zhong et al. |
| 10,871,045 B2 | 12/2020 | Fischer et al. |
| 10,895,202 B1 | 1/2021 | Yeung et al. |
| 10,900,475 B2 | 1/2021 | Weightman et al. |
| 10,907,459 B1 | 2/2021 | Yeung et al. |
| 10,927,774 B2 | 2/2021 | Cai et al. |
| 10,927,802 B2 | 2/2021 | Oehring |
| 10,954,770 B1 | 3/2021 | Yeung et al. |
| 10,954,855 B1 | 3/2021 | Ji et al. |
| 10,961,908 B1 | 3/2021 | Yeung et al. |
| 10,961,912 B1 | 3/2021 | Yeung et al. |
| 10,961,914 B1 | 3/2021 | Yeung et al. |
| 10,961,993 B1 | 3/2021 | Ji et al. |
| 10,961,995 B2 | 3/2021 | Mayorca |
| 10,982,523 B1 | 4/2021 | Hill et al. |
| 10,989,019 B2 | 4/2021 | Cai et al. |
| 10,995,564 B2 | 5/2021 | Miller et al. |
| 11,002,189 B2 | 5/2021 | Yeung et al. |
| 11,008,950 B2 | 5/2021 | Ethier et al. |
| 11,015,423 B1 | 5/2021 | Yeung et al. |
| 11,035,213 B2 | 6/2021 | Dusterhoft et al. |
| 11,035,214 B2 | 6/2021 | Cui et al. |
| 11,047,379 B1 | 6/2021 | Li et al. |
| 11,053,853 B2 | 7/2021 | Li et al. |
| 11,060,455 B1 | 7/2021 | Yeung et al. |
| 11,066,915 B1 | 7/2021 | Yeung et al. |
| 11,068,455 B2 | 7/2021 | Shabi et al. |
| 11,085,281 B1 | 8/2021 | Yeung et al. |
| 11,085,282 B2 | 8/2021 | Mazrooee et al. |
| 11,105,250 B1 | 8/2021 | Zhang et al. |
| 11,105,266 B2 | 8/2021 | Zhou et al. |
| 11,125,156 B2 | 9/2021 | Zhang et al. |
| 11,143,000 B2 | 10/2021 | Li et al. |
| 11,143,005 B2 | 10/2021 | Dusterhoft et al. |
| 11,143,006 B1 | 10/2021 | Zhang et al. |
| 11,168,681 B2 | 11/2021 | Boguski |
| 11,236,739 B2 | 2/2022 | Yeung et al. |
| 11,242,737 B2 | 2/2022 | Zhang et al. |
| 11,243,509 B2 | 2/2022 | Cai et al. |
| 11,251,650 B1 | 2/2022 | Liu et al. |
| 11,261,717 B2 | 3/2022 | Yeung et al. |
| 11,268,346 B2 | 3/2022 | Yeung et al. |
| 11,280,266 B2 | 3/2022 | Yeung et al. |
| 11,306,835 B1 | 4/2022 | Dille et al. |
| RE49,083 E | 5/2022 | Case et al. |
| 11,339,638 B1 | 5/2022 | Yeung et al. |
| 11,346,200 B2 | 5/2022 | Cai et al. |
| 11,373,058 B2 | 6/2022 | Jaaskelainen et al. |
| RE49,140 E | 7/2022 | Case et al. |
| 11,377,943 B2 | 7/2022 | Kriebel et al. |
| RE49,155 E | 8/2022 | Case et al. |
| RE49,156 E | 8/2022 | Case et al. |
| 11,401,927 B2 | 8/2022 | Li et al. |
| 11,428,165 B2 | 8/2022 | Yeung et al. |
| 11,441,483 B2 | 9/2022 | Li et al. |
| 11,448,122 B2 | 9/2022 | Feng et al. |
| 11,466,680 B2 | 10/2022 | Yeung et al. |
| 11,480,040 B2 | 10/2022 | Han et al. |
| 11,492,887 B2 | 11/2022 | Cui et al. |
| 11,499,405 B2 | 11/2022 | Zhang et al. |
| 11,506,039 B2 | 11/2022 | Zhang et al. |
| 11,512,570 B2 | 11/2022 | Yeung |
| 11,519,395 B2 | 12/2022 | Zhang et al. |
| 11,519,405 B2 | 12/2022 | Deng et al. |
| 11,530,602 B2 | 12/2022 | Yeung et al. |
| 11,549,349 B2 | 1/2023 | Wang et al. |
| 11,555,390 B2 | 1/2023 | Cui et al. |
| 11,555,756 B2 | 1/2023 | Yeung et al. |
| 11,557,887 B2 | 1/2023 | Ji et al. |
| 11,560,779 B2 | 1/2023 | Mao et al. |
| 11,560,845 B2 | 1/2023 | Yeung et al. |
| 11,572,775 B2 | 2/2023 | Mao et al. |
| 11,575,249 B2 | 2/2023 | Ji et al. |
| 11,592,020 B2 | 2/2023 | Chang et al. |
| 11,596,047 B2 | 2/2023 | Liu et al. |
| 11,598,263 B2 | 3/2023 | Yeung et al. |
| 11,603,797 B2 | 3/2023 | Zhang et al. |
| 11,607,982 B2 | 3/2023 | Tian et al. |
| 11,608,726 B2 | 3/2023 | Zhang et al. |
| 11,624,326 B2 | 4/2023 | Yeung et al. |
| 11,629,583 B2 | 4/2023 | Yeung et al. |
| 11,629,589 B2 | 4/2023 | Lin et al. |
| 11,649,766 B1 | 5/2023 | Yeung et al. |
| 11,662,384 B2 | 5/2023 | Liu et al. |
| 11,668,173 B2 | 6/2023 | Zhang et al. |
| 11,668,289 B2 | 6/2023 | Chang et al. |
| 11,677,238 B2 | 6/2023 | Liu et al. |
| 2002/0126922 A1 | 9/2002 | Cheng et al. |
| 2002/0197176 A1 | 12/2002 | Kondo |
| 2003/0031568 A1 | 2/2003 | Stiefel |
| 2003/0061819 A1 | 4/2003 | Kuroki et al. |
| 2003/0161212 A1 | 8/2003 | Neal et al. |

(56) References Cited

U.S. PATENT DOCUMENTS

| | | |
|---|---|---|
| 2004/0016245 A1 | 1/2004 | Pierson |
| 2004/0074238 A1 | 4/2004 | Wantanabe et al. |
| 2004/0076526 A1 | 4/2004 | Fukano et al. |
| 2004/0187950 A1 | 9/2004 | Cohen et al. |
| 2004/0219040 A1 | 11/2004 | Kugelev et al. |
| 2005/0051322 A1 | 3/2005 | Speer |
| 2005/0056081 A1 | 3/2005 | Gocho |
| 2005/0139286 A1 | 6/2005 | Poulter |
| 2005/0196298 A1 | 9/2005 | Manning |
| 2005/0226754 A1 | 10/2005 | Orr et al. |
| 2005/0274134 A1 | 12/2005 | Ryu et al. |
| 2006/0061091 A1 | 3/2006 | Osterloh |
| 2006/0062914 A1 | 3/2006 | Garg et al. |
| 2006/0196251 A1 | 9/2006 | Richey |
| 2006/0211356 A1 | 9/2006 | Grassman |
| 2006/0228225 A1 | 10/2006 | Rogers |
| 2006/0260331 A1 | 11/2006 | Andreychuk |
| 2006/0272333 A1 | 12/2006 | Sundin |
| 2007/0029090 A1 | 2/2007 | Andreychuk et al. |
| 2007/0041848 A1 | 2/2007 | Wood et al. |
| 2007/0066406 A1 | 3/2007 | Keller et al. |
| 2007/0098580 A1 | 5/2007 | Petersen |
| 2007/0107981 A1 | 5/2007 | Sicotte |
| 2007/0125544 A1 | 6/2007 | Robinson et al. |
| 2007/0169543 A1 | 7/2007 | Fazekas |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0006089 A1 | 1/2008 | Adnan et al. |
| 2008/0098891 A1 | 5/2008 | Feher |
| 2008/0161974 A1 | 7/2008 | Alston |
| 2008/0212275 A1 | 9/2008 | Waryck et al. |
| 2008/0229757 A1 | 9/2008 | Alexander et al. |
| 2008/0264625 A1 | 10/2008 | Ochoa |
| 2008/0264649 A1 | 10/2008 | Crawford |
| 2008/0298982 A1 | 12/2008 | Pabst |
| 2009/0064685 A1 | 3/2009 | Busekros et al. |
| 2009/0068031 A1* | 3/2009 | Gambier ............... F04B 47/02 417/364 |
| 2009/0092510 A1 | 4/2009 | Williams et al. |
| 2009/0124191 A1 | 5/2009 | Van Becelaere et al. |
| 2009/0178412 A1* | 7/2009 | Spytek .................. F23R 3/58 60/752 |
| 2009/0212630 A1 | 8/2009 | Flegel et al. |
| 2009/0249794 A1 | 10/2009 | Wilkes et al. |
| 2009/0252616 A1 | 10/2009 | Brunet et al. |
| 2009/0308602 A1 | 12/2009 | Bruins et al. |
| 2010/0019626 A1 | 1/2010 | Stout et al. |
| 2010/0071899 A1 | 3/2010 | Coquilleau et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0041681 A1 | 2/2011 | Duerr |
| 2011/0052423 A1 | 3/2011 | Gambier et al. |
| 2011/0054704 A1 | 3/2011 | Karpman et al. |
| 2011/0085924 A1 | 4/2011 | Shampine et al. |
| 2011/0146244 A1 | 6/2011 | Farman et al. |
| 2011/0146246 A1 | 6/2011 | Farman et al. |
| 2011/0173991 A1* | 7/2011 | Dean .................. F01D 1/32 60/801 |
| 2011/0197988 A1 | 8/2011 | Van Vliet et al. |
| 2011/0241888 A1 | 10/2011 | Lu et al. |
| 2011/0265443 A1 | 11/2011 | Ansari |
| 2011/0272158 A1 | 11/2011 | Neal |
| 2012/0023973 A1 | 2/2012 | Mayorca |
| 2012/0048242 A1 | 3/2012 | Surnilla et al. |
| 2012/0085541 A1 | 4/2012 | Love et al. |
| 2012/0137699 A1* | 6/2012 | Montagne ............. F23K 5/18 60/779 |
| 2012/0179444 A1 | 7/2012 | Ganguly et al. |
| 2012/0192542 A1* | 8/2012 | Chillar ................. F02C 9/40 60/39.463 |
| 2012/0199001 A1 | 8/2012 | Chillar et al. |
| 2012/0204627 A1 | 8/2012 | Anderl et al. |
| 2012/0255734 A1 | 10/2012 | Coli et al. |
| 2012/0310509 A1 | 12/2012 | Pardo et al. |
| 2012/0324903 A1 | 12/2012 | Dewis et al. |
| 2013/0068307 A1 | 3/2013 | Hains et al. |
| 2013/0087045 A1 | 4/2013 | Sullivan et al. |
| 2013/0087945 A1 | 4/2013 | Kusters et al. |
| 2013/0134702 A1 | 5/2013 | Boraas et al. |
| 2013/0189915 A1 | 7/2013 | Hazard |
| 2013/0205798 A1 | 8/2013 | Kwok et al. |
| 2013/0233165 A1 | 9/2013 | Matzner et al. |
| 2013/0255953 A1 | 10/2013 | Tudor |
| 2013/0259707 A1 | 10/2013 | Yin |
| 2013/0284455 A1 | 10/2013 | Kajaria et al. |
| 2013/0300341 A1 | 11/2013 | Gillette |
| 2013/0306322 A1 | 11/2013 | Sanbom |
| 2014/0000668 A1 | 1/2014 | Lessard |
| 2014/0010671 A1 | 1/2014 | Cryer et al. |
| 2014/0013768 A1 | 1/2014 | Laing et al. |
| 2014/0032082 A1 | 1/2014 | Gehrke et al. |
| 2014/0044517 A1 | 2/2014 | Saha et al. |
| 2014/0048253 A1 | 2/2014 | Andreychuk |
| 2014/0090729 A1 | 4/2014 | Coulter et al. |
| 2014/0090742 A1 | 4/2014 | Coskrey et al. |
| 2014/0094105 A1 | 4/2014 | Lundh et al. |
| 2014/0095114 A1 | 4/2014 | Thomeer et al. |
| 2014/0095554 A1 | 4/2014 | Thomeer et al. |
| 2014/0123621 A1 | 5/2014 | Driessens et al. |
| 2014/0130422 A1 | 5/2014 | Laing et al. |
| 2014/0138079 A1 | 5/2014 | Broussard et al. |
| 2014/0144641 A1* | 5/2014 | Chandler ............... F24H 9/2035 166/303 |
| 2014/0147291 A1 | 5/2014 | Burnette |
| 2014/0158345 A1 | 6/2014 | Jang et al. |
| 2014/0174097 A1 | 6/2014 | Hammer et al. |
| 2014/0196459 A1 | 7/2014 | Futa et al. |
| 2014/0216736 A1 | 8/2014 | Leugemors et al. |
| 2014/0219824 A1* | 8/2014 | Burnette .................. F04B 47/00 417/53 |
| 2014/0250845 A1 | 9/2014 | Jackson et al. |
| 2014/0251623 A1 | 9/2014 | Lestz et al. |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2014/0322050 A1 | 10/2014 | Marette et al. |
| 2015/0027730 A1 | 1/2015 | Hall et al. |
| 2015/0078924 A1 | 3/2015 | Zhang et al. |
| 2015/0101344 A1 | 4/2015 | Jarrier et al. |
| 2015/0114652 A1 | 4/2015 | Lestz et al. |
| 2015/0129210 A1 | 5/2015 | Chong et al. |
| 2015/0135659 A1 | 5/2015 | Jarrier et al. |
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0214816 A1 | 7/2015 | Raad |
| 2015/0217672 A1 | 8/2015 | Shampine et al. |
| 2015/0226140 A1 | 8/2015 | Zhang et al. |
| 2015/0252661 A1 | 9/2015 | Glass |
| 2015/0275891 A1 | 10/2015 | Chong et al. |
| 2015/0337730 A1* | 11/2015 | Kupiszewski ............ F02C 7/16 60/39.465 |
| 2015/0340864 A1 | 11/2015 | Compton |
| 2015/0345385 A1 | 12/2015 | Santini |
| 2015/0369351 A1 | 12/2015 | Hermann et al. |
| 2016/0032703 A1 | 2/2016 | Broussard et al. |
| 2016/0032836 A1 | 2/2016 | Hawkinson et al. |
| 2016/0076447 A1 | 3/2016 | Merlo et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0123185 A1 | 5/2016 | Le Pache et al. |
| 2016/0168979 A1 | 6/2016 | Zhang et al. |
| 2016/0177675 A1 | 6/2016 | Morris et al. |
| 2016/0177945 A1 | 6/2016 | Byrne et al. |
| 2016/0186671 A1 | 6/2016 | Austin et al. |
| 2016/0195082 A1 | 7/2016 | Wiegman et al. |
| 2016/0215774 A1 | 7/2016 | Oklejas et al. |
| 2016/0230525 A1 | 8/2016 | Lestz et al. |

(56) References Cited

U.S. PATENT DOCUMENTS

| | | |
|---|---|---|
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0258267 A1 | 9/2016 | Payne et al. |
| 2016/0273328 A1 | 9/2016 | Oehring |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0326845 A1 | 11/2016 | Djikpesse et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0045055 A1 | 2/2017 | Hoefel et al. |
| 2017/0052087 A1 | 2/2017 | Faqihi et al. |
| 2017/0074074 A1 | 3/2017 | Joseph et al. |
| 2017/0074076 A1 | 3/2017 | Joseph et al. |
| 2017/0074089 A1 | 3/2017 | Agarwal et al. |
| 2017/0082110 A1 | 3/2017 | Lammers |
| 2017/0089189 A1 | 3/2017 | Norris et al. |
| 2017/0114613 A1 | 4/2017 | Ecerf et al. |
| 2017/0114625 A1 | 4/2017 | Norris et al. |
| 2017/0122310 A1 | 5/2017 | Ladron de Guevara |
| 2017/0131174 A1 | 5/2017 | Enev et al. |
| 2017/0145918 A1 | 5/2017 | Oehring et al. |
| 2017/0191350 A1 | 7/2017 | Johns et al. |
| 2017/0218727 A1 | 8/2017 | Oehring et al. |
| 2017/0226839 A1 | 8/2017 | Broussard et al. |
| 2017/0226842 A1 | 8/2017 | Omont et al. |
| 2017/0226998 A1 | 8/2017 | Zhang et al. |
| 2017/0227002 A1 | 8/2017 | Mikulski et al. |
| 2017/0233103 A1* | 8/2017 | Teicholz ............. B64D 27/16 701/100 |
| 2017/0234165 A1 | 8/2017 | Kersey et al. |
| 2017/0234308 A1 | 8/2017 | Buckley |
| 2017/0241336 A1 | 8/2017 | Jones et al. |
| 2017/0241671 A1 | 8/2017 | Ahmad |
| 2017/0248034 A1 | 8/2017 | Dzieciol et al. |
| 2017/0248208 A1 | 8/2017 | Tamura |
| 2017/0248308 A1 | 8/2017 | Makarychev-Mikhailov et al. |
| 2017/0275149 A1 | 9/2017 | Schmidt |
| 2017/0288400 A1 | 10/2017 | Williams |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0306847 A1* | 10/2017 | Suciu .................. F02C 6/08 |
| 2017/0306936 A1 | 10/2017 | Dole |
| 2017/0322086 A1 | 11/2017 | Luharuka |
| 2017/0333086 A1 | 11/2017 | Jackson |
| 2017/0334448 A1 | 11/2017 | Schwunk |
| 2017/0335842 A1 | 11/2017 | Robinson et al. |
| 2017/0350471 A1 | 12/2017 | Steidl et al. |
| 2017/0356470 A1 | 12/2017 | Jaffrey |
| 2017/0370199 A1 | 12/2017 | Witkowski et al. |
| 2017/0370480 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0038216 A1 | 3/2018 | Zhang et al. |
| 2018/0058171 A1 | 3/2018 | Roesner et al. |
| 2018/0087499 A1 | 3/2018 | Zhang et al. |
| 2018/0087996 A1 | 3/2018 | De La Cruz |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0209415 A1 | 7/2018 | Zhang et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevag et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0290877 A1 | 10/2018 | Shock |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0313456 A1 | 11/2018 | Bayyouk et al. |
| 2018/0328157 A1 | 11/2018 | Bishop |
| 2018/0334893 A1 | 11/2018 | Behring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0011051 A1 | 1/2019 | Yeung |
| 2019/0048993 A1 | 2/2019 | Akiyama et al. |
| 2019/0063263 A1 | 2/2019 | Davis et al. |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0088845 A1 | 3/2019 | Sugi et al. |
| 2019/0091619 A1 | 3/2019 | Huang |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0128288 A1 | 5/2019 | Konada et al. |
| 2019/0131607 A1 | 5/2019 | Gillette |
| 2019/0136677 A1 | 5/2019 | Shampine et al. |
| 2019/0153843 A1 | 5/2019 | Headrick et al. |
| 2019/0153938 A1 | 5/2019 | Hammoud |
| 2019/0154020 A1 | 5/2019 | Glass |
| 2019/0155318 A1 | 5/2019 | Meunier |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0211661 A1 | 7/2019 | Reckles et al. |
| 2019/0211814 A1 | 7/2019 | Weightman et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0277279 A1 | 9/2019 | Byrne et al. |
| 2019/0277295 A1 | 9/2019 | Clyburn et al. |
| 2019/0309585 A1 | 10/2019 | Miller et al. |
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0337392 A1 | 11/2019 | Joshi et al. |
| 2019/0338762 A1 | 11/2019 | Curry et al. |
| 2019/0345920 A1 | 11/2019 | Surjaatmadja et al. |
| 2019/0353103 A1* | 11/2019 | Roberge .................. F02C 7/32 |
| 2019/0356199 A1 | 11/2019 | Morris et al. |
| 2019/0376449 A1 | 12/2019 | Carrell |
| 2019/0383123 A1 | 12/2019 | Hinderliter |
| 2020/0003205 A1 | 1/2020 | Stokkevag et al. |
| 2020/0011165 A1 | 1/2020 | George et al. |
| 2020/0040878 A1 | 2/2020 | Morris |
| 2020/0049136 A1 | 2/2020 | Stephenson |

(56) References Cited

U.S. PATENT DOCUMENTS

| | | |
|---|---|---|
| 2020/0049153 A1 | 2/2020 | Headrick et al. |
| 2020/0071998 A1 | 3/2020 | Oehring et al. |
| 2020/0072201 A1 | 3/2020 | Marica |
| 2020/0088202 A1 | 3/2020 | Sigmar et al. |
| 2020/0095854 A1 | 3/2020 | Hinderliter |
| 2020/0109610 A1 | 4/2020 | Husoy et al. |
| 2020/0109616 A1 | 4/2020 | Oehring et al. |
| 2020/0132058 A1 | 4/2020 | Mollatt |
| 2020/0141219 A1 | 5/2020 | Oehring et al. |
| 2020/0141326 A1 | 5/2020 | Redford et al. |
| 2020/0141907 A1 | 5/2020 | Meck et al. |
| 2020/0166026 A1 | 5/2020 | Marica |
| 2020/0206704 A1 | 7/2020 | Chong |
| 2020/0208733 A1 | 7/2020 | Kim |
| 2020/0223648 A1 | 7/2020 | Herman et al. |
| 2020/0224645 A1 | 7/2020 | Buckley |
| 2020/0232454 A1 | 7/2020 | Chretien et al. |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0291731 A1 | 9/2020 | Haiderer et al. |
| 2020/0295574 A1 | 9/2020 | Batsch-Smith |
| 2020/0300050 A1 | 9/2020 | Oehring et al. |
| 2020/0309027 A1 | 10/2020 | Rytkonen |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0325791 A1 | 10/2020 | Himmelmann |
| 2020/0325893 A1 | 10/2020 | Kraige et al. |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0354928 A1 | 11/2020 | Wehler et al. |
| 2020/0355055 A1 | 11/2020 | Pusterhoft et al. |
| 2020/0362760 A1* | 11/2020 | Morenko ............... F02C 7/228 |
| 2020/0362764 A1* | 11/2020 | Saintignan ............ F02C 9/42 |
| 2020/0370394 A1 | 11/2020 | Cai et al. |
| 2020/0370408 A1 | 11/2020 | Cai et al. |
| 2020/0370429 A1 | 11/2020 | Cai et al. |
| 2020/0371490 A1 | 11/2020 | Cai et al. |
| 2020/0340322 A1 | 12/2020 | Sizemore et al. |
| 2020/0386169 A1 | 12/2020 | Hinderliter et al. |
| 2020/0386222 A1 | 12/2020 | Pham et al. |
| 2020/0388140 A1 | 12/2020 | Gomez et al. |
| 2020/0392826 A1 | 12/2020 | Cui et al. |
| 2020/0392827 A1 | 12/2020 | George et al. |
| 2020/0393088 A1 | 12/2020 | Sizemore et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0407625 A1 | 12/2020 | Stephenson |
| 2020/0408071 A1 | 12/2020 | Li et al. |
| 2020/0408144 A1 | 12/2020 | Feng et al. |
| 2020/0408147 A1 | 12/2020 | Zhang et al. |
| 2020/0408149 A1 | 12/2020 | Li et al. |
| 2021/0025324 A1 | 1/2021 | Morris et al. |
| 2021/0025383 A1 | 1/2021 | Bodishbaugh et al. |
| 2021/0032961 A1 | 2/2021 | Hinderliter et al. |
| 2021/0054727 A1 | 2/2021 | Floyd |
| 2021/0071503 A1 | 3/2021 | Ogg et al. |
| 2021/0071574 A1 | 3/2021 | Feng et al. |
| 2021/0071579 A1 | 3/2021 | Li et al. |
| 2021/0071654 A1 | 3/2021 | Brunson |
| 2021/0071752 A1 | 3/2021 | Cui et al. |
| 2021/0079758 A1 | 3/2021 | Yeung et al. |
| 2021/0079851 A1 | 3/2021 | Yeung et al. |
| 2021/0086851 A1 | 3/2021 | Zhang et al. |
| 2021/0087883 A1 | 3/2021 | Zhang et al. |
| 2021/0087916 A1 | 3/2021 | Zhang et al. |
| 2021/0087925 A1 | 3/2021 | Heidari et al. |
| 2021/0087943 A1 | 3/2021 | Cui et al. |
| 2021/0088042 A1 | 3/2021 | Zhang et al. |
| 2021/0123425 A1 | 4/2021 | Cui et al. |
| 2021/0123434 A1 | 4/2021 | Cui et al. |
| 2021/0123435 A1 | 4/2021 | Cui et al. |
| 2021/0131409 A1 | 5/2021 | Cui et al. |
| 2021/0140416 A1 | 5/2021 | Buckley |
| 2021/0148208 A1 | 5/2021 | Thomas et al. |
| 2021/0156240 A1 | 5/2021 | Cicci et al. |
| 2021/0156241 A1 | 5/2021 | Cook |
| 2021/0172282 A1 | 6/2021 | Wang et al. |
| 2021/0180517 A1 | 6/2021 | Zhou et al. |
| 2021/0190045 A1 | 6/2021 | Zhang et al. |
| 2021/0199110 A1 | 7/2021 | Albert et al. |
| 2021/0222690 A1 | 7/2021 | Beisel |
| 2021/0239112 A1 | 8/2021 | Buckley |
| 2021/0246774 A1 | 8/2021 | Cui et al. |
| 2021/0270261 A1 | 9/2021 | Zhang et al. |
| 2021/0270264 A1 | 9/2021 | Byrne |
| 2021/0285311 A1 | 9/2021 | Ji et al. |
| 2021/0285432 A1 | 9/2021 | Ji et al. |
| 2021/0301807 A1 | 9/2021 | Cui et al. |
| 2021/0306720 A1 | 9/2021 | Sandoval et al. |
| 2021/0308638 A1 | 10/2021 | Zhong et al. |
| 2021/0324718 A1 | 10/2021 | Anders |
| 2021/0348475 A1 | 11/2021 | Yeung et al. |
| 2021/0348476 A1 | 11/2021 | Yeung et al. |
| 2021/0348477 A1 | 11/2021 | Yeung et al. |
| 2021/0355927 A1 | 11/2021 | Jian et al. |
| 2021/0372394 A1 | 12/2021 | Bagulayan et al. |
| 2021/0372395 A1 | 12/2021 | Li et al. |
| 2021/0376413 A1 | 12/2021 | Asfha |
| 2021/0388760 A1 | 12/2021 | Feng et al. |
| 2022/0082007 A1 | 3/2022 | Zhang et al. |
| 2022/0090476 A1 | 3/2022 | Zhang et al. |
| 2022/0090477 A1 | 3/2022 | Zhang et al. |
| 2022/0090478 A1 | 3/2022 | Zhang et al. |
| 2022/0112892 A1 | 4/2022 | Cui et al. |
| 2022/0120262 A1 | 4/2022 | Ji et al. |
| 2022/0145740 A1 | 5/2022 | Yuan et al. |
| 2022/0154775 A1 | 5/2022 | Liu et al. |
| 2022/0155373 A1 | 5/2022 | Liu et al. |
| 2022/0162931 A1 | 5/2022 | Zhong et al. |
| 2022/0162991 A1 | 5/2022 | Zhang et al. |
| 2022/0181859 A1 | 6/2022 | Ji et al. |
| 2022/0186724 A1 | 6/2022 | Chang et al. |
| 2022/0213777 A1 | 7/2022 | Cui et al. |
| 2022/0220836 A1 | 7/2022 | Zhang et al. |
| 2022/0224087 A1 | 7/2022 | Ji et al. |
| 2022/0228468 A1 | 7/2022 | Cui et al. |
| 2022/0228469 A1 | 7/2022 | Zhang et al. |
| 2022/0235639 A1 | 7/2022 | Zhang et al. |
| 2022/0235640 A1 | 7/2022 | Mao et al. |
| 2022/0235641 A1 | 7/2022 | Zhang et al. |
| 2022/0235642 A1 | 7/2022 | Zhang et al. |
| 2022/0235802 A1 | 7/2022 | Jiang et al. |
| 2022/0242297 A1 | 8/2022 | Tian et al. |
| 2022/0243613 A1 | 8/2022 | Ji et al. |
| 2022/0243724 A1 | 8/2022 | Li et al. |
| 2022/0250000 A1 | 8/2022 | Zhang et al. |
| 2022/0255319 A1 | 8/2022 | Liu et al. |
| 2022/0258659 A1 | 8/2022 | Cui et al. |
| 2022/0259947 A1 | 8/2022 | Li et al. |
| 2022/0259964 A1 | 8/2022 | Zhang et al. |
| 2022/0268201 A1 | 8/2022 | Feng et al. |
| 2022/0282606 A1 | 9/2022 | Zhong et al. |
| 2022/0282726 A1 | 9/2022 | Zhang et al. |
| 2022/0290549 A1 | 9/2022 | Zhang et al. |
| 2022/0294194 A1 | 9/2022 | Cao et al. |
| 2022/0298906 A1 | 9/2022 | Zhong et al. |
| 2022/0307359 A1 | 9/2022 | Liu et al. |
| 2022/0307424 A1 | 9/2022 | Wang et al. |
| 2022/0314248 A1 | 10/2022 | Ge et al. |
| 2022/0315347 A1 | 10/2022 | Liu et al. |
| 2022/0316306 A1 | 10/2022 | Liu et al. |

(56) References Cited

U.S. PATENT DOCUMENTS

| | | |
|---|---|---|
| 2022/0316362 A1 | 10/2022 | Zhang et al. |
| 2022/0316461 A1 | 10/2022 | Wang et al. |
| 2022/0325608 A1 | 10/2022 | Zhang et al. |
| 2022/0330411 A1 | 10/2022 | Liu et al. |
| 2022/0333471 A1 | 10/2022 | Zhong et al. |
| 2022/0339646 A1 | 10/2022 | Yu et al. |
| 2022/0341358 A1 | 10/2022 | Ji et al. |
| 2022/0341362 A1 | 10/2022 | Feng et al. |
| 2022/0341415 A1 | 10/2022 | Deng et al. |
| 2022/0345007 A1 | 10/2022 | Liu et al. |
| 2022/0349345 A1 | 11/2022 | Zhang et al. |
| 2022/0353980 A1 | 11/2022 | Liu et al. |
| 2022/0361309 A1 | 11/2022 | Liu et al. |
| 2022/0364452 A1 | 11/2022 | Wang et al. |
| 2022/0364453 A1 | 11/2022 | Chang et al. |
| 2022/0372865 A1 | 11/2022 | Lin et al. |
| 2022/0376280 A1 | 11/2022 | Shao et al. |
| 2022/0381126 A1 | 12/2022 | Cui et al. |
| 2022/0389799 A1 | 12/2022 | Mao |
| 2022/0389803 A1 | 12/2022 | Zhang et al. |
| 2022/0389804 A1 | 12/2022 | Cui et al. |
| 2022/0389865 A1 | 12/2022 | Feng et al. |
| 2022/0389867 A1 | 12/2022 | Li et al. |
| 2022/0412196 A1 | 12/2022 | Cui et al. |
| 2022/0412199 A1 | 12/2022 | Mao et al. |
| 2022/0412200 A1 | 12/2022 | Zhang et al. |
| 2022/0412258 A1 | 12/2022 | Li et al. |
| 2022/0412379 A1 | 12/2022 | Wang et al. |
| 2023/0001524 A1 | 1/2023 | Jiang et al. |
| 2023/0003238 A1 | 1/2023 | Du et al. |
| 2023/0015132 A1 | 1/2023 | Feng et al. |
| 2023/0015529 A1 | 1/2023 | Zhang et al. |
| 2023/0015581 A1 | 1/2023 | Ji et al. |
| 2023/0017968 A1 | 1/2023 | Deng et al. |
| 2023/0029574 A1 | 2/2023 | Zhang et al. |
| 2023/0029671 A1 | 2/2023 | Han et al. |
| 2023/0036118 A1 | 2/2023 | King et al. |
| 2023/0040970 A1 | 2/2023 | Liu et al. |
| 2023/0042379 A1 | 2/2023 | Zhang et al. |
| 2023/0047033 A1 | 2/2023 | Fu et al. |
| 2023/0048551 A1 | 2/2023 | Feng et al. |
| 2023/0049462 A1 | 2/2023 | Zhang et al. |
| 2023/0064964 A1 | 3/2023 | Wang et al. |
| 2023/0074794 A1 | 3/2023 | Liu et al. |
| 2023/0085124 A1 | 3/2023 | Zhong et al. |
| 2023/0092506 A1 | 3/2023 | Zhong et al. |
| 2023/0092705 A1 | 3/2023 | Liu et al. |
| 2023/0106683 A1 | 4/2023 | Zhang et al. |
| 2023/0107300 A1 | 4/2023 | Huang et al. |
| 2023/0107791 A1 | 4/2023 | Zhang et al. |
| 2023/0109018 A1 | 4/2023 | Du et al. |
| 2023/0116458 A1 | 4/2023 | Liu et al. |
| 2023/0117362 A1 | 4/2023 | Zhang et al. |
| 2023/0119725 A1 | 4/2023 | Wang et al. |
| 2023/0119876 A1 | 4/2023 | Mao et al. |
| 2023/0119896 A1 | 4/2023 | Zhang et al. |
| 2023/0120810 A1 | 4/2023 | Fu et al. |
| 2023/0121251 A1 | 4/2023 | Cui et al. |
| 2023/0124444 A1 | 4/2023 | Chang et al. |
| 2023/0138582 A1 | 5/2023 | Li et al. |
| 2023/0144116 A1 | 5/2023 | Li et al. |
| 2023/0145963 A1 | 5/2023 | Zhang et al. |
| 2023/0151722 A1 | 5/2023 | Cui et al. |
| 2023/0151723 A1 | 5/2023 | Ji et al. |
| 2023/0152793 A1 | 5/2023 | Wang et al. |
| 2023/0160289 A1 | 5/2023 | Cui et al. |
| 2023/0160510 A1 | 5/2023 | Bao et al. |
| 2023/0163580 A1 | 5/2023 | Ji et al. |
| 2023/0167776 A1 | 6/2023 | Cui et al. |

FOREIGN PATENT DOCUMENTS

| | | |
|---|---|---|
| CA | 2043184 | 8/1994 |
| CA | 2829762 | 9/2012 |
| CA | 2737321 | 9/2013 |
| CA | 2876687 A1 | 5/2014 |
| CA | 2693567 | 9/2014 |
| CA | 2964597 | 10/2017 |
| CA | 2876687 C | 4/2019 |
| CA | 3138533 | 11/2020 |
| CA | 2919175 | 3/2021 |
| CN | 2622404 | 6/2004 |
| CN | 2779054 | 5/2006 |
| CN | 2890325 | 4/2007 |
| CN | 200964929 Y | 10/2007 |
| CN | 101323151 A | 12/2008 |
| CN | 201190660 Y | 2/2009 |
| CN | 201190892 Y | 2/2009 |
| CN | 201190893 Y | 2/2009 |
| CN | 101414171 A | 4/2009 |
| CN | 201215073 Y | 4/2009 |
| CN | 201236650 Y | 5/2009 |
| CN | 201275542 Y | 7/2009 |
| CN | 201275801 Y | 7/2009 |
| CN | 201333385 Y | 10/2009 |
| CN | 201443300 U | 4/2010 |
| CN | 201496415 U | 6/2010 |
| CN | 201501365 U | 6/2010 |
| CN | 201507271 U | 6/2010 |
| CN | 101323151 B | 7/2010 |
| CN | 201560210 U | 8/2010 |
| CN | 201581862 U | 9/2010 |
| CN | 201610728 U | 10/2010 |
| CN | 201610751 U | 10/2010 |
| CN | 201618530 U | 11/2010 |
| CN | 201661255 U | 12/2010 |
| CN | 101949382 | 1/2011 |
| CN | 201756927 U | 3/2011 |
| CN | 101414171 B | 5/2011 |
| CN | 102128011 A | 7/2011 |
| CN | 102140898 A | 8/2011 |
| CN | 102155172 A | 8/2011 |
| CN | 102182904 | 9/2011 |
| CN | 202000930 U | 10/2011 |
| CN | 202055781 U | 11/2011 |
| CN | 202082265 U | 12/2011 |
| CN | 202100216 U | 1/2012 |
| CN | 202100217 U | 1/2012 |
| CN | 202100815 U | 1/2012 |
| CN | 202124340 U | 1/2012 |
| CN | 202140051 U | 2/2012 |
| CN | 202140080 U | 2/2012 |
| CN | 202144789 U | 2/2012 |
| CN | 202144943 U | 2/2012 |
| CN | 202149354 U | 2/2012 |
| CN | 102383748 A | 3/2012 |
| CN | 202156297 U | 3/2012 |
| CN | 202158355 U | 3/2012 |
| CN | 202163504 U | 3/2012 |
| CN | 202165236 U | 3/2012 |
| CN | 202180866 U | 4/2012 |
| CN | 202181875 U | 4/2012 |
| CN | 202187744 U | 4/2012 |
| CN | 202191854 U | 4/2012 |
| CN | 202250008 U | 5/2012 |
| CN | 101885307 | 7/2012 |
| CN | 102562020 A | 7/2012 |
| CN | 202326156 U | 7/2012 |
| CN | 202370773 U | 8/2012 |
| CN | 202417397 U | 9/2012 |
| CN | 202417461 U | 9/2012 |
| CN | 102729335 A | 10/2012 |
| CN | 202463955 U | 10/2012 |
| CN | 202463957 U | 10/2012 |
| CN | 202467739 U | 10/2012 |
| CN | 202467801 U | 10/2012 |
| CN | 202531016 U | 11/2012 |
| CN | 202544794 U | 11/2012 |
| CN | 102825039 A | 12/2012 |
| CN | 202578592 U | 12/2012 |
| CN | 202579164 U | 12/2012 |
| CN | 202594808 U | 12/2012 |
| CN | 202594928 U | 12/2012 |
| CN | 202596615 U | 12/2012 |

(56) References Cited

FOREIGN PATENT DOCUMENTS

| | | |
|---|---|---|
| CN | 202596616 U | 12/2012 |
| CN | 102849880 A | 1/2013 |
| CN | 102889191 A | 1/2013 |
| CN | 202641535 U | 1/2013 |
| CN | 202645475 U | 1/2013 |
| CN | 202666716 U | 1/2013 |
| CN | 202669645 U | 1/2013 |
| CN | 202669944 U | 1/2013 |
| CN | 202671336 U | 1/2013 |
| CN | 202673269 U | 1/2013 |
| CN | 202751982 U | 2/2013 |
| CN | 102963629 A | 3/2013 |
| CN | 202767964 U | 3/2013 |
| CN | 202789791 U | 3/2013 |
| CN | 202789792 U | 3/2013 |
| CN | 202810717 U | 3/2013 |
| CN | 202827276 U | 3/2013 |
| CN | 202833093 U | 3/2013 |
| CN | 202833370 U | 3/2013 |
| CN | 102140898 B | 4/2013 |
| CN | 202895467 U | 4/2013 |
| CN | 202926404 U | 5/2013 |
| CN | 202935216 U | 5/2013 |
| CN | 202935798 U | 5/2013 |
| CN | 202935816 U | 5/2013 |
| CN | 202970631 U | 6/2013 |
| CN | 103223315 A | 7/2013 |
| CN | 203050598 U | 7/2013 |
| CN | 103233714 A | 8/2013 |
| CN | 103233715 A | 8/2013 |
| CN | 103245523 A | 8/2013 |
| CN | 103247220 A | 8/2013 |
| CN | 103253839 A | 8/2013 |
| CN | 103277290 A | 9/2013 |
| CN | 103321782 A | 9/2013 |
| CN | 203170270 U | 9/2013 |
| CN | 203172509 U | 9/2013 |
| CN | 203175778 U | 9/2013 |
| CN | 203175787 U | 9/2013 |
| CN | 102849880 B | 10/2013 |
| CN | 203241231 U | 10/2013 |
| CN | 203244941 U | 10/2013 |
| CN | 203244942 U | 10/2013 |
| CN | 203303798 U | 11/2013 |
| CN | PCT/CN2012/074945 | 11/2013 |
| CN | 102155172 B | 12/2013 |
| CN | 102729335 B | 12/2013 |
| CN | 103420532 A | 12/2013 |
| CN | 203321792 U | 12/2013 |
| CN | 203412658 | 1/2014 |
| CN | 203420697 U | 2/2014 |
| CN | 203480755 U | 3/2014 |
| CN | 103711437 A | 4/2014 |
| CN | 203531815 U | 4/2014 |
| CN | 203531871 U | 4/2014 |
| CN | 203531883 U | 4/2014 |
| CN | 203556164 U | 4/2014 |
| CN | 203558809 U | 4/2014 |
| CN | 203559861 U | 4/2014 |
| CN | 203559893 U | 4/2014 |
| CN | 203560189 U | 4/2014 |
| CN | 102704870 B | 5/2014 |
| CN | 203611843 U | 5/2014 |
| CN | 203612531 U | 5/2014 |
| CN | 203612843 U | 5/2014 |
| CN | 203614062 U | 5/2014 |
| CN | 203614388 U | 5/2014 |
| CN | 203621045 U | 6/2014 |
| CN | 203621046 U | 6/2014 |
| CN | 203621051 U | 6/2014 |
| CN | 203640993 U | 6/2014 |
| CN | 203655221 U | 6/2014 |
| CN | 103899280 A | 7/2014 |
| CN | 103923670 A | 7/2014 |
| CN | 203685052 U | 7/2014 |
| CN | 203716936 U | 7/2014 |
| CN | 103990410 A | 8/2014 |
| CN | 103993869 A | 8/2014 |
| CN | 203754009 U | 8/2014 |
| CN | 203754025 U | 8/2014 |
| CN | 203754341 U | 8/2014 |
| CN | 203756614 U | 8/2014 |
| CN | 203770264 U | 8/2014 |
| CN | 203784519 U | 8/2014 |
| CN | 203784520 U | 8/2014 |
| CN | 104057864 A | 9/2014 |
| CN | 203819819 U | 9/2014 |
| CN | 203823431 U | 9/2014 |
| CN | 203835337 U | 9/2014 |
| CN | 104074500 A | 10/2014 |
| CN | 203876633 U | 10/2014 |
| CN | 203876636 U | 10/2014 |
| CN | 203877364 U | 10/2014 |
| CN | 203877365 U | 10/2014 |
| CN | 203877375 U | 10/2014 |
| CN | 203877424 U | 10/2014 |
| CN | 203879476 U | 10/2014 |
| CN | 203879479 U | 10/2014 |
| CN | 203890292 U | 10/2014 |
| CN | 203899476 U | 10/2014 |
| CN | 203906206 U | 10/2014 |
| CN | 104150728 A | 11/2014 |
| CN | 104176522 A | 12/2014 |
| CN | 104196464 A | 12/2014 |
| CN | 104234651 A | 12/2014 |
| CN | 203971841 U | 12/2014 |
| CN | 203975450 U | 12/2014 |
| CN | 204020788 U | 12/2014 |
| CN | 204021980 U | 12/2014 |
| CN | 204024625 U | 12/2014 |
| CN | 204051401 U | 12/2014 |
| CN | 204060661 U | 12/2014 |
| CN | 104260672 A | 1/2015 |
| CN | 104314512 A | 1/2015 |
| CN | 204077478 U | 1/2015 |
| CN | 204077526 U | 1/2015 |
| CN | 204078307 U | 1/2015 |
| CN | 204083051 U | 1/2015 |
| CN | 204113168 U | 1/2015 |
| CN | 104340682 A | 2/2015 |
| CN | 104358536 A | 2/2015 |
| CN | 104369687 A | 2/2015 |
| CN | 104402178 A | 3/2015 |
| CN | 104402185 A | 3/2015 |
| CN | 104402186 A | 3/2015 |
| CN | 204209819 U | 3/2015 |
| CN | 204224560 U | 3/2015 |
| CN | 204225813 U | 3/2015 |
| CN | 204225839 U | 3/2015 |
| CN | 104533392 A | 4/2015 |
| CN | 104563938 A | 4/2015 |
| CN | 104563994 A | 4/2015 |
| CN | 104563995 A | 4/2015 |
| CN | 104563998 A | 4/2015 |
| CN | 104564033 A | 4/2015 |
| CN | 204257122 U | 4/2015 |
| CN | 204283610 U | 4/2015 |
| CN | 204283782 U | 4/2015 |
| CN | 204297682 U | 4/2015 |
| CN | 204299810 U | 4/2015 |
| CN | 103223315 B | 5/2015 |
| CN | 104594857 A | 5/2015 |
| CN | 104595493 A | 5/2015 |
| CN | 104612647 A | 5/2015 |
| CN | 104612928 A | 5/2015 |
| CN | 104632126 A | 5/2015 |
| CN | 204325094 U | 5/2015 |
| CN | 204325098 U | 5/2015 |
| CN | 204326983 U | 5/2015 |
| CN | 204326985 U | 5/2015 |
| CN | 204344040 U | 5/2015 |
| CN | 204344095 U | 5/2015 |
| CN | 104727797 A | 6/2015 |
| CN | 204402414 U | 6/2015 |

(56) References Cited

FOREIGN PATENT DOCUMENTS

| | | |
|---|---|---|
| CN | 204402423 U | 6/2015 |
| CN | 204402450 U | 6/2015 |
| CN | 103247220 B | 7/2015 |
| CN | 104803568 A | 7/2015 |
| CN | 204436360 U | 7/2015 |
| CN | 204457524 U | 7/2015 |
| CN | 204472485 U | 7/2015 |
| CN | 204473625 U | 7/2015 |
| CN | 204477303 U | 7/2015 |
| CN | 204493095 U | 7/2015 |
| CN | 204493309 U | 7/2015 |
| CN | 103253839 B | 8/2015 |
| CN | 104820372 A | 8/2015 |
| CN | 104832093 A | 8/2015 |
| CN | 104863523 A | 8/2015 |
| CN | 204552723 U | 8/2015 |
| CN | 204553866 U | 8/2015 |
| CN | 204571831 U | 8/2015 |
| CN | 204703814 U | 10/2015 |
| CN | 204703833 U | 10/2015 |
| CN | 204703834 U | 10/2015 |
| CN | 105092401 A | 11/2015 |
| CN | 103233715 B | 12/2015 |
| CN | 103790927 | 12/2015 |
| CN | 105207097 | 12/2015 |
| CN | 204831952 U | 12/2015 |
| CN | 204899777 U | 12/2015 |
| CN | 102602323 | 1/2016 |
| CN | 105240064 A | 1/2016 |
| CN | 204944834 | 1/2016 |
| CN | 205042127 U | 2/2016 |
| CN | 205172478 U | 4/2016 |
| CN | 103993869 B | 5/2016 |
| CN | 105536299 A | 5/2016 |
| CN | 105545207 A | 5/2016 |
| CN | 205260249 | 5/2016 |
| CN | 103233714 B | 6/2016 |
| CN | 104340682 B | 6/2016 |
| CN | 205297518 U | 6/2016 |
| CN | 205298447 U | 6/2016 |
| CN | 205391821 U | 7/2016 |
| CN | 205400701 U | 7/2016 |
| CN | 103277290 B | 8/2016 |
| CN | 104260672 B | 8/2016 |
| CN | 205477370 U | 8/2016 |
| CN | 205479153 U | 8/2016 |
| CN | 205503058 U | 8/2016 |
| CN | 205503068 U | 8/2016 |
| CN | 205503089 U | 8/2016 |
| CN | 105958098 A | 9/2016 |
| CN | 205599180 | 9/2016 |
| CN | 205599180 U | 9/2016 |
| CN | 106121577 A | 11/2016 |
| CN | 205709587 | 11/2016 |
| CN | 104612928 B | 12/2016 |
| CN | 106246120 A | 12/2016 |
| CN | 205805471 | 12/2016 |
| CN | 106321045 A | 1/2017 |
| CN | 205858306 | 1/2017 |
| CN | 106438310 A | 2/2017 |
| CN | 205937833 | 2/2017 |
| CN | 104563994 B | 3/2017 |
| CN | 206129196 | 4/2017 |
| CN | 104369687 B | 5/2017 |
| CN | 106715165 | 5/2017 |
| CN | 106761561 A | 5/2017 |
| CN | 105240064 B | 6/2017 |
| CN | 206237147 | 6/2017 |
| CN | 206287832 | 6/2017 |
| CN | 206346711 | 7/2017 |
| CN | 104563995 B | 9/2017 |
| CN | 107120822 | 9/2017 |
| CN | 107143298 A | 9/2017 |
| CN | 107159046 A | 9/2017 |
| CN | 107188018 A | 9/2017 |
| CN | 206496016 | 9/2017 |
| CN | 104564033 B | 10/2017 |
| CN | 107234358 A | 10/2017 |
| CN | 107261975 A | 10/2017 |
| CN | 206581929 | 10/2017 |
| CN | 104820372 B | 12/2017 |
| CN | 105092401 B | 12/2017 |
| CN | 107476769 A | 12/2017 |
| CN | 107520526 A | 12/2017 |
| CN | 206754664 | 12/2017 |
| CN | 107605427 A | 1/2018 |
| CN | 106438310 B | 2/2018 |
| CN | 107654196 A | 2/2018 |
| CN | 107656499 A | 2/2018 |
| CN | 107728657 A | 2/2018 |
| CN | 206985503 | 2/2018 |
| CN | 207017968 | 2/2018 |
| CN | 107859053 A | 3/2018 |
| CN | 207057867 | 3/2018 |
| CN | 207085817 | 3/2018 |
| CN | 105545207 B | 4/2018 |
| CN | 107883091 A | 4/2018 |
| CN | 107902427 A | 4/2018 |
| CN | 107939290 A | 4/2018 |
| CN | 107956708 | 4/2018 |
| CN | 207169595 | 4/2018 |
| CN | 207194873 | 4/2018 |
| CN | 207245674 | 4/2018 |
| CN | 108034466 A | 5/2018 |
| CN | 108036071 A | 5/2018 |
| CN | 108087050 A | 5/2018 |
| CN | 207380566 | 5/2018 |
| CN | 108103483 A | 6/2018 |
| CN | 108179046 A | 6/2018 |
| CN | 108254276 A | 7/2018 |
| CN | 108311535 A | 7/2018 |
| CN | 207583576 | 7/2018 |
| CN | 207634064 | 7/2018 |
| CN | 207648054 | 7/2018 |
| CN | 207650621 | 7/2018 |
| CN | 108371894 A | 8/2018 |
| CN | 207777153 | 8/2018 |
| CN | 108547601 A | 9/2018 |
| CN | 108547766 A | 9/2018 |
| CN | 108555826 A | 9/2018 |
| CN | 108561098 A | 9/2018 |
| CN | 108561750 A | 9/2018 |
| CN | 108590617 A | 9/2018 |
| CN | 207813495 | 9/2018 |
| CN | 207814698 | 9/2018 |
| CN | 207862275 | 9/2018 |
| CN | 108687954 A | 10/2018 |
| CN | 207935270 | 10/2018 |
| CN | 207961582 | 10/2018 |
| CN | 207964530 | 10/2018 |
| CN | 108789848 A | 11/2018 |
| CN | 108799473 | 11/2018 |
| CN | 108868675 A | 11/2018 |
| CN | 208086829 | 11/2018 |
| CN | 208089263 | 11/2018 |
| CN | 208169068 | 11/2018 |
| CN | 108979569 A | 12/2018 |
| CN | 109027662 A | 12/2018 |
| CN | 109058092 A | 12/2018 |
| CN | 208179454 | 12/2018 |
| CN | 208179502 | 12/2018 |
| CN | 208253147 | 12/2018 |
| CN | 208260574 | 12/2018 |
| CN | 109114418 A | 1/2019 |
| CN | 109141990 A | 1/2019 |
| CN | 208313120 | 1/2019 |
| CN | 208330319 | 1/2019 |
| CN | 208342730 | 1/2019 |
| CN | 208430982 | 1/2019 |
| CN | 208430986 | 1/2019 |
| CN | 109404274 A | 3/2019 |
| CN | 109429610 A | 3/2019 |
| CN | 109491318 A | 3/2019 |
| CN | 109515177 A | 3/2019 |

(56) References Cited

FOREIGN PATENT DOCUMENTS

| | | |
|---|---|---|
| CN | 109526523 A | 3/2019 |
| CN | 109534737 A | 3/2019 |
| CN | 208564504 | 3/2019 |
| CN | 208564516 | 3/2019 |
| CN | 208564525 | 3/2019 |
| CN | 208564918 | 3/2019 |
| CN | 208576026 | 3/2019 |
| CN | 208576042 | 3/2019 |
| CN | 208650818 | 3/2019 |
| CN | 208669244 | 3/2019 |
| CN | 109555484 A | 4/2019 |
| CN | 109682881 A | 4/2019 |
| CN | 208730959 | 4/2019 |
| CN | 208735264 | 4/2019 |
| CN | 208746733 | 4/2019 |
| CN | 208749529 | 4/2019 |
| CN | 208750405 | 4/2019 |
| CN | 208764658 | 4/2019 |
| CN | 109736740 A | 5/2019 |
| CN | 109751007 A | 5/2019 |
| CN | 208868428 | 5/2019 |
| CN | 208870761 | 5/2019 |
| CN | 109869294 A | 6/2019 |
| CN | 109882144 A | 6/2019 |
| CN | 109882372 A | 6/2019 |
| CN | 209012047 | 6/2019 |
| CN | 209100025 | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 | 9/2019 |
| CN | 110374745 A | 10/2019 |
| CN | 209534736 | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |
| CN | 110513097 A | 11/2019 |
| CN | 209650738 | 11/2019 |
| CN | 209653968 | 11/2019 |
| CN | 209654004 | 11/2019 |
| CN | 209654022 | 11/2019 |
| CN | 209654128 | 11/2019 |
| CN | 209656622 | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 | 12/2019 |
| CN | 209780827 | 12/2019 |
| CN | 209798631 | 12/2019 |
| CN | 209799942 | 12/2019 |
| CN | 209800178 | 12/2019 |
| CN | 209855723 | 12/2019 |
| CN | 209855742 | 12/2019 |
| CN | 209875063 | 12/2019 |
| CN | 110656919 A | 1/2020 |
| CN | 10848028 A | 2/2020 |
| CN | 107520526 B | 2/2020 |
| CN | 110787667 A | 2/2020 |
| CN | 110821464 A | 2/2020 |
| CN | 110833665 A | 2/2020 |
| CN | 210049880 | 2/2020 |
| CN | 210049882 | 2/2020 |
| CN | 210097596 | 2/2020 |
| CN | 210105817 | 2/2020 |
| CN | 210105818 | 2/2020 |
| CN | 210105993 | 2/2020 |
| CN | 110873093 A | 3/2020 |
| CN | 210139911 | 3/2020 |
| CN | 110947681 A | 4/2020 |
| CN | 111058810 A | 4/2020 |
| CN | 111075391 A | 4/2020 |
| CN | 210289931 | 4/2020 |
| CN | 210289932 | 4/2020 |
| CN | 210289933 | 4/2020 |
| CN | 210303516 | 4/2020 |
| CN | 211412945 | 4/2020 |
| CN | 111089003 A | 5/2020 |
| CN | 111151186 A | 5/2020 |
| CN | 111167769 A | 5/2020 |
| CN | 111169833 A | 5/2020 |
| CN | 111173476 A | 5/2020 |
| CN | 111185460 A | 5/2020 |
| CN | 111185461 A | 5/2020 |
| CN | 111188763 A | 5/2020 |
| CN | 111206901 A | 5/2020 |
| CN | 111206992 A | 5/2020 |
| CN | 111206994 A | 5/2020 |
| CN | 210449044 | 5/2020 |
| CN | 210460875 | 5/2020 |
| CN | 210522432 | 5/2020 |
| CN | 210598943 | 5/2020 |
| CN | 210598945 | 5/2020 |
| CN | 210598946 | 5/2020 |
| CN | 210599194 | 5/2020 |
| CN | 210599303 | 5/2020 |
| CN | 210600110 | 5/2020 |
| CN | 111219326 A | 6/2020 |
| CN | 111350595 A | 6/2020 |
| CN | 210660319 | 6/2020 |
| CN | 210714569 | 6/2020 |
| CN | 210769168 | 6/2020 |
| CN | 210769169 | 6/2020 |
| CN | 210769170 | 6/2020 |
| CN | 210770133 | 6/2020 |
| CN | 210825844 | 6/2020 |
| CN | 210888904 | 6/2020 |
| CN | 210888905 | 6/2020 |
| CN | 210889242 | 6/2020 |
| CN | 111397474 A | 7/2020 |
| CN | 111412064 A | 7/2020 |
| CN | 111441923 A | 7/2020 |
| CN | 111441925 A | 7/2020 |
| CN | 111503517 A | 8/2020 |
| CN | 111515898 A | 8/2020 |
| CN | 111594059 A | 8/2020 |
| CN | 111594062 A | 8/2020 |
| CN | 111594144 A | 8/2020 |
| CN | 211201919 | 8/2020 |
| CN | 211201920 | 8/2020 |
| CN | 211202218 | 8/2020 |
| CN | 111608965 A | 9/2020 |
| CN | 111664087 A | 9/2020 |
| CN | 111677476 A | 9/2020 |
| CN | 111677647 A | 9/2020 |
| CN | 111692064 A | 9/2020 |
| CN | 111692065 A | 9/2020 |

(56) References Cited

FOREIGN PATENT DOCUMENTS

| | | |
|---|---|---|
| CN | 211384571 | 9/2020 |
| CN | 211397553 | 9/2020 |
| CN | 211397677 | 9/2020 |
| CN | 211500955 | 9/2020 |
| CN | 211524765 | 9/2020 |
| DE | 4004854 | 8/1991 |
| DE | 4241614 | 6/1994 |
| DE | 102009022859 | 12/2010 |
| DE | 102012018825 | 3/2014 |
| DE | 102013111655 | 12/2014 |
| DE | 102015103872 | 10/2015 |
| DE | 102013114335 | 12/2020 |
| EP | 0835983 | 4/1998 |
| EP | 1378683 | 1/2004 |
| EP | 2143916 | 1/2010 |
| EP | 2613023 | 7/2013 |
| EP | 3095989 | 11/2016 |
| EP | 3211766 | 8/2017 |
| EP | 3049642 | 4/2018 |
| EP | 3354866 | 8/2018 |
| EP | 3075946 | 5/2019 |
| FR | 2795774 | 6/1999 |
| GB | 474072 | 10/1937 |
| GB | 1438172 | 6/1976 |
| JP | S57135212 | 2/1984 |
| KR | 20020026398 | 4/2002 |
| RU | 13562 | 4/2000 |
| WO | 1993020328 | 10/1993 |
| WO | 2006025886 | 3/2006 |
| WO | 2009023042 | 2/2009 |
| WO | 20110133821 | 10/2011 |
| WO | 2012139380 | 10/2012 |
| WO | 2013158822 | 10/2013 |
| WO | 2013185399 | 12/2013 |
| WO | 2015158020 | 10/2015 |
| WO | 2016/014476 | 1/2016 |
| WO | 2016033983 | 3/2016 |
| WO | 2016078181 | 5/2016 |
| WO | 2016101374 | 6/2016 |
| WO | 2016112590 | 7/2016 |
| WO | 2016/186790 | 11/2016 |
| WO | 2017123656 A | 7/2017 |
| WO | 2017146279 | 8/2017 |
| WO | 2017213848 | 12/2017 |
| WO | 2018031029 | 2/2018 |
| WO | 2018038710 | 3/2018 |
| WO | 2018044293 | 3/2018 |
| WO | 2018044307 | 3/2018 |
| WO | 2018071738 | 4/2018 |
| WO | 2018101909 | 6/2018 |
| WO | 2018101912 | 6/2018 |
| WO | 2018106210 | 6/2018 |
| WO | 2018106225 | 6/2018 |
| WO | 2018106252 | 6/2018 |
| WO | 2018/132106 | 7/2018 |
| WO | 2018156131 | 8/2018 |
| WO | 2018075034 | 10/2018 |
| WO | 2018187346 | 10/2018 |
| WO | 2018031031 | 2/2019 |
| WO | 2019045691 | 3/2019 |
| WO | 2019046680 | 3/2019 |
| WO | 2019060922 | 3/2019 |
| WO | 2019117862 | 6/2019 |
| WO | 2019126742 | 6/2019 |
| WO | 2019147601 | 8/2019 |
| WO | 2019169366 | 9/2019 |
| WO | 2019195651 | 10/2019 |
| WO | 2019200510 | 10/2019 |
| WO | 2019210417 | 11/2019 |
| WO | 2020018068 | 1/2020 |
| WO | 2020046866 | 3/2020 |
| WO | 2020072076 | 4/2020 |
| WO | 2020076569 | 4/2020 |
| WO | 2020097060 | 5/2020 |
| WO | 2020104088 | 5/2020 |
| WO | 2020131085 A1 | 6/2020 |
| WO | 2020211083 | 10/2020 |
| WO | 2020211086 | 10/2020 |
| WO | 2021/038604 | 3/2021 |
| WO | 2021038604 | 3/2021 |
| WO | 2021041783 | 3/2021 |

OTHER PUBLICATIONS

US 11,555,493 B2, 01/2023, Chang et al. (withdrawn)
ISM, What is Cracking Pressure, 2019 (Year: 2019).*
Swagelok, The right valve for controlling flow direction? Check, 2016 (Year: 2016).*
Technology.org, Check valves how do they work and what are the main type, 2018 (Year: 2018).*
SPM® QEM 5000 E-Frac Pump Specification Sheet, Weir Group (2019) ("Weir 5000").
Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").
Dowell B908 "Turbo-Jet" Operator's Manual.
Jereh Debut's Super-power Turbine Fracturing Pump, Leading the Industrial Revolution, Jereh Oilfield Services Group (Mar. 19, 2014), https://www.prnewswire.com/news-releases/jereh-debuts-super-power-turbine-fracturing-pump-leading-the-industrial-revolution-250992111.html.
Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www.prnewswire.com/news-releases/jereh-apollo-4500-turbine-frac-pumper-finishes-successful-field-operation-in-china-300035829.html.
35% Economy Increase, Dual-fuel System Highlighting Jereh Apollo Frac Pumper, Jereh Group (Apr. 13, 2015), https://www.jereh.com/en/news/press-release/news-detail-7345.htm.
Hydraulic Fracturing: Gas turbine proves successful in shale gas field operations, Vericor (2017), https://www.vericor.com/wp-content/ uploads/2020/02/7.-Fracing-4500hp-Pump-China-En.pdf ("Vericor Case Study").
Jereh Apollo Turbine Fracturing Pumper Featured on China Central Television, Jereh Group (Mar. 9, 2018), https://www.jereh.com/en/news/press-release/news-detail-7267.htm.
Jereh Unveiled New Electric Fracturing Solution at OTC 2019, Jereh Group (May 7, 2019), as available on May 28, 2019, https://web.archive.org/web/20190528183906/https://www.prnewswire.com/news-releases/jereh-unveiled-new-electric-fracturing-solution-at-otc-2019-300845028.html.
Jereh Group, Jereh Fracturing Unit, Fracturing Spread, YouTube (Mar. 30, 2015), https://www.youtube.com/watch?V=PlkDbU5dE0o.
Transcript of Jereh Group, Jereh Fracturing Unit, Fracturing Spread, YouTube (Mar. 30, 2015).
Jereh Group, Jereh Fracturing Equipment. YouTube (Jun. 8, 2015), https://www.youtube.com/watch?v=m0vMiq84P4Q.
Transcript of Jereh Group, Jereh Fracturing Equipment, YouTube (Jun. 8, 2015), https://www.youtube.com/watch?v=m0vMiq84P4Q.
Ferdinand P. Beer et al., Mechanics of Materials (6th ed. 2012).
Weir Oil & Gas Introduces Industry's First Continuous Duty 5000-Horsepower Pump, Weir Group (Jul. 25, 2019), https://www.global. weir/newsroom/news-articles/weir-oil-and-gas-introduces-industrys-first-continuous-duty-5000-horsepower-pump/.
2012 High Horsepower Summit Agenda, Natural Gas for High Horsepower Applications (Sep. 5, 2012).
Review of HHP Summit 2012, Gladstein, Neandross & Associates https://www.gladstein.org/gna-conferences/high-horsepower-summit-2012/.
Green Field Energy Services Deploys Third New Hydraulic Fracturing System, Green Field Energy Services, Inc. (Jul. 11, 2012), https://www.prnewswire.com/news-releases/green-field-energy-services-deploys-third-new-hydraulic-fracturing-spread-162113425.
Karen Boman, Turbine Technology Powers Green Field Multi-Fuel Frack Pump, Rigzone (Mar. 7, 2015), as available on Mar. 14, 2015,

(56) References Cited

OTHER PUBLICATIONS https://web.archive.org/web/20150314203227/https://www.rigzone.com/news/oil-gas/a/124883/Turbine_Technology_Powers_Green_Field_MultiFuel_Frack_Pump.
"Turbine Frac Units," WMD Squared (2012), https://wmdsquared.com/ work/gfes-turbine-frac-units/.
Leslie Turj, Green Field asset sale called 'largest disposition industry has seen,' The INDsider Media (Mar. 19, 2014), http://theind.com/ article-16497-green-field-asset-sale-called-%E2%80%98largest-disposition-industry-has-seen%60.html.
Europump and Hydrualic Institute, Variable Speed Pumping: A Guide to Successful Applications, Elsevier Ltd, 2004.
Capstone Turbine Corporation, Capstone Receives Three Megawatt Order from Large Independent Oil & Gas Company in Eagle Ford Shale Play, Dec. 7, 2010.
Wikipedia, Westinghouse Combustion Turbine Systems Division, https://en.wikipedia.org/wiki/Westinghouse_Combustion_Turbine_Systems_Division, circa 1960.
Wikipedia,Union Pacific GTELs, https://en.wikipedia.org/wiki/Union_Pacific_GTELs, circa 1950.
HCI JET Frac, Screenshots from YouTube, Dec. 11, 2010. https://www.youtube.com/watch?v=6HjXkdbFaFQ.
AFD Petroleum Ltd., Automated Hot Zone, Frac Refueling System, Dec. 2018.
Eygun, Christiane, et al., URTeC: 2687987, Mitigating Shale Gas Developments Carbon Footprint: Evaluating and Implementing Solutions in Argentina, Copyright 2017, Unconventional Resources Technology Conference.
Walzel, Brian, Hart Energy, Oil, Gas Industry Discovers Innovative Solutions to Environmental Concerns, Dec. 10, 2018.
Frac Shack, Bi-Fuel FracFueller brochure, 2011.
Pettigrew, Dana, et al., High Pressure Multi-Stage Centrifugal Pump for 10,000 psi Frac Pump—HPHPS Frac Pump, Copyright 2013, Society of Petroleum Engineers, SPE 166191.
Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.
Wallace, E.M., Associated Shale Gas: From Flares to Rig Power, Copyright 2015, Society of Petroleum Engineers, SPE-173491-MS.
Williams, C.W. (Gulf Oil Corp. Odessa Texas), The Use of Gas-turbine Engines in an Automated High-Pressure Water-Injection Stations; American Petroleum Institute; API-63-144 (Jan. 1, 1963).
Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).
Porter, John A. (Solar Division International Harvester Co.), Modern Industrial Gas Turbines for the Oil Field; American Petroleum Institute; Drilling and Production Practice; API-67-243 (Jan. 1, 1967).
Cooper et al., Jet Frac Porta-Skid—A New Concept in Oil Field Service Pump Equipments[sic]; Halliburton Services; SPE-2706 (1969).
Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).
Kas'yanov et al., Application of gas turbine engines in pumping units complexes of hydraulic fracturing of oil and gas reservoirs; Exposition Oil & Gas; (Oct. 2012) (published in Russian).
AFGlobal Corporation, Durastim Hydraulic Fracturing Pump, A Revolutionary Design for Continuous Duty Hydraulic Fracturing, 2018.
American Petroleum Institute. API 674: Positive Displacement Pumps—Reciprocating. 3rd ed. Washington, DC: API Publishing Services, 2010.
American Petroleum Institute. API 616: Gas Turbines for the Petroleum, Chemical, and Gas Industry Services. 5th ed. Washington, DC: API Publishing Services, 2011.

Karassik, Igor, Joseph Messina, Paul Cooper, and Charles Heald. Pump Handbook. 4th ed. New York: McGraw-Hill Education, 2008.
Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/pumpdatabase2/weir-spm-general.pdf.
The Weir Group, Inc. Weir SPM Pump Product Catalog. Ft. Worth, TX: S.P.M. Flow Control, Inc. Oct. 30, 2017. https://manage.global.weir/assets/files/product%20brochures/SPM_2P140706_Pump_Product_Catalogue_View.pdf.
Shandong Saigao Group Corporation. Q4 (5W115) Quintuplex Plunger Pump. Jinan City, Shandong Province, China: Saigao. Oct. 20, 2014. https://www.saigaogroup.com/product/q400-5w115-quintuplex-plunger-pump.html.
Marine Turbine. Turbine Powered Frac Units. Franklin, Louisiana: Marine Turbine Technologies, 2020.
Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q2700.pdf, 2021.
CanDyne Pump Services, Inc. Weatherford Q700 Pump. Calgary, Alberta, Canada: CanDyne Pump Services. Aug. 15, 2015. http://candyne.com/wp-content/uploads/2014/U.S. Appl. No. 10/181,905-94921.q700-quintuplex-pump.pdf.
Arop, Julius Bankong. Geomechanical review of hydraulic fracturing technology. Thesis (M. Eng.). Cambridge, MA: Massachusetts Institute of Technology, Dept. of Civil and Environmental Engineering. Oct. 29, 2013. https://dspace.mit.edu/handle/1721.1/82176.
ResearchGate, Answer by Byron Woolridge, found at https://www.researchgate.net/post/How_can_we_improve_the_efficiency_of_the_gas_turbine_cycles, Jan. 1, 2013.
Filipović, Ivan, Preliminary Selection of Basic Parameters of Different Torsional Vibration Dampers Intended for use in Medium-Speed Diesel Engines, Transactions of Famena XXXVI-3 (2012).
Marine Turbine Technologies, 1 MW Power Generation Package, http://marineturbine.com/power-generation, 2017.
Business Week: Fiber-optic cables help fracking, cablinginstall.com. Jul. 12, 2013. https://www.cablinginstall.com/cable/article/16474208/businessweek-fiberoptic-cables-help-fracking.
Fracking companies switch to electric motors to power pumps, iadd-intl.org. Jun. 27, 2019. https://www.iadd-intl.org/articles/fracking-companies-switch-to-electric-motors-to-power-pumps/.
The Leader in Frac Fueling, suncoastresources.com. Jun. 29, 2015. https://web.archive.org/web/20150629220609/https://www.suncoastresources.com/oilfield/fueling-services/.
Mobile Fuel Delivery, atlasoil.com. Mar. 6, 2019. https://www.atlasoil.com/nationwide-fueling/onsite-and-mobile-fueling.
Frac Tank Hose (FRAC), 4starhose.com. Accessed: Nov. 10, 2019. http://www.4starhose.com/product/frac_tank_hose_frac.aspx.
Plos One, Dynamic Behavior of Reciprocating Plunger Pump Discharge Valve Based on Fluid Structure Interaction and Experimental Analysis. Oct. 21, 2015.
FMC Technologies, Operation and Maintenance Manual, L06 Through L16 Triplex Pumps Doc No. OMM50000903 Rev: E p. 1 of 66. Aug. 27, 2009.
Gardner Denver Hydraulic Fracturing Pumps GD 3000 https://www.gardnerdenver.com/en-us/pumps/triplex-fracking-pump-gd-3000.
Ekontsev, Yu M., et al. "Two-side sealer operation." Journal of Mining Science 49.5 (2013): 757-762.
Tom Hausfeld, GE Power & Water, and Eldon Schelske, Evolution Well Services, TM2500+ Power for Hydraulic Fracturing.
FTS International's Dual Fuel Hydraulic Fracturing Equipment Increases Operational Efficiencies, Provides Cost Benefits, Jan. 3, 2018.
CNG Delivery, Fracturing with natural gas, dual-fuel drilling with CNG, Aug. 22, 2019.
Pbng, Natural Gas Fuel for Drilling and Hydraulic Fracturing, Diesel Displacement / Dual Fuel & Bi-Fuel, May 2014.
Integrated Flow, Skid-mounted Modular Process Systems, https://ifsolutions.com/.

(56) References Cited

OTHER PUBLICATIONS

Cameron, A Schlumberger Company, Frac Manifold Systems, 2016.
ZSi-Foster, Energy | Solar | Fracking | Oil and Gas, https://www.zsi-foster.com/energy-solar-fracking-oil-and-gas.html.
JBG Enterprises, Inc., Ws-Series Blowout Prevention Safety Coupling—Quick Release Couplings, http://www.jgbhose.com/products/WS-Series-Blowout-Prevention-Safety-Coupling.asp.
Halliburton, Vessel-based Modular Solution (VMS), 2015.
Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.
Wolf, Jürgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.
Ginter, Timothy, and Thomas Bouvay. "Uprate options for the MS7001 heavy duty gas turbine." GE paper GER-3808C, GE Energy 12 (2006).
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Ecob, David J., et al. "Design and Development of a Landfill Gas Combustion System for the Typhoon Gas Turbine." ASME 1996 International Gas Turbine and Aeroengine Congress and Exhibition. American Society of Mechanical ingineers Digital Collection, 1996.
II-VI Marlow Industries, Thermoelectric Technologies in Oil, Gas, and Mining Industries, blog.marlow.com (Jul. 24, 2019).
B.M. Mahlalela, et al., .Electric Power Generation Potential Based on Waste Heat and Geothermal Resources in South Africa, pangea stanford.edu (Feb. 11, 2019).
Department of Energy, United States of America, The Water-Energy Nexus: Challenges and Opportunities purenergypolicy.org (Jun. 2014).
Ankit Tiwari, Design of a Cooling System for a Hydraulic Fracturing Equipment, The Pennsylvania State University, The Graduate School, College of Engineering, 2015.
Jp Yadav et al., Power Enhancement of Gas Turbine Plant by Intake Air Fog Cooling, Jun. 2015.
Mee Industries: Inlet Air Fogging Systems for Oil, Gas and Petrochemical Processing, Verdict Media Limited Copyright 2020.
M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.
Advances in Popular Torque-Link Solution Offer OEMs Greater Benefit, Jun. 21, 2018.
Emmanuel Akita et al., Mewbourne College of Earth & Energy, Society of Petroleum Engineers; Drilling Systems Automation Technical Section (DSATS); 2019.
PowerShelter Kit II, nooutage.com, Sep. 6, 2019.
EMPengineering.com, HEMP Resistant Electrical Generators / Hardened Structures HEMP/GMD Shielded Generators, Virginia.
Blago Minovski, Coupled Simulations of Cooling and Engine Systems for Unsteady Analysis of the Benefits of Thermal Engine Encapsulation, Department of Applied Mechanics, Chalmers University of Technology Goteborg, Sweden 2015.
J. Porteiro et al., Feasibility of a new domestic CHP trigeneration with heat pump: II. Availability analysis. Design and development, Applied Thermal Engineering 24 (2004) 1421-1429.
De Gevigney et al., "Analysis of no-load dependent power losses in a planetary gear train by using thermal network method", International Gear Conference 2014: Aug. 26-28, 2014, Lyon, pp. 615-624.

"Honghua developing new-generation shale-drilling rig, plans testing of frac pump"; Katherine Scott; Drilling Contractor; May 23, 2013; accessed at https://www.drillingcontractororg/honghua-developing-new-generation-shale-drilling-rig-plans-testing-of-frac-pump-23278.
Special-Purpose Couplings for Petroleum, Chemical, and Gas Industry Services, API Standard 671 (4th Edition) (2010).
The Application of Flexible Couplings for Turbomachinery, Jon R.Mancuso et al., Proceedings of the Eighteenthturbomachinery Symposium (1989).
Pump Control With Variable Frequency Drives, Kevin Tory, Pumps & Systems: Advances in Motors and Drives, Reprint from Jun. 2008.
Fracture Design and Stimulation, Mike Eberhard, P.E., Wellconstruction & Operations Technical Workshop Insupport of the EPA Hydraulic Fracturing Study, Mar. 10-11, 2011.
General Purpose vs. Special Purpose Couplings, Jon Mancuso, Proceedings of the Twenty-Third Turbomachinerysymposium (1994).
Overview of Industry Guidance/Best Practices on Hydraulic Fracturing (HF), American Petroleum Institute, ® 2012.
API Member Companies, American Petroleum Institute, WaybackMachine Capture, https://web.archive.org/web/20130424080625/http://api.org/globalitems/globalheaderpages/membership/api-member-companies, accessed Jan. 4, 2021.
API's Global Industry Services, American Petroleum Institute, ® Aug. 2020.
About API, American Petroleum Institute, https://www.api.org /about, accessed Dec. 30, 2021.
About API, American Petroleum Institute, WaybackMachine Capture, https://web.archive.org/web/20110422104346 /http://api.org/aboutapi/, captured Apr. 22, 2011.
Publications, American Petroleum Institute, WaybackMachine Capture, https://web.archive.org/web/20110427043936 /http://www.api.org:80/Publications/, captured Apr. 27, 2011.
Procedures for Standards Development, American Petroleum Institute, Third Edition (2006).
WorldCat Library Collections Database Records for API Standard 671 and API Standard 674, https://www.worldcat.org/title/positive-displacement-pumps-reciprocating/oclc/ 858692269&referer=brief_results, accessed Dec. 30, 2021; and https://www.worldcat.org/title/special-purpose-couplings-for-petroleum-chemical-and-gas-industry-services/oclc/871254217&referer=brief_results, accessed Dec. 22, 2021.
2011 Publications and Services, American Petroleum Institute (2011).
Standards, American Petroleum Institute, WaybackMachine Capture, https://web.archive.org/web/20110207195046/http:/www.api.org/Standards/, captured Feb. 7, 2011; and https://web.archive.org/web/20110204112554/http://global.ihs.com/?RID=API1, captured Feb. 4, 2011.
IHS Markit Standards Store, https://global.ihs.com/doc_detail.cfm?document_name=API%20STD%20674&item_s_key=00010672#doc-detail-history-anchor, accessed Dec. 30, 2021; and https://global.ihs.com/doc_detail.cfm?&input_doc_number=671&input_doc_title=&document_name=API%20STD%20671&item_s_key=00010669&item_key_date=890331&origin=DSSC, accessed Dec. 30, 2021.
Rigmaster Machinery Ltd., Model: 2000 RMP-6-PLEX, brochure, downloaded at https://www.rigmastermachinery.com/_files/ugd/431e62_eaecd77c9fe54af8b13d08396072da67.pdf.
International Search Report and Written Opinion for PCT/US2022/030647, dated Oct. 7, 2022.
Dziubak, Tadeusz, "Experimental Studies of Dust Suction Irregularity from Multi-Cyclone Dust Collector of Two-Stage Air Filter", Energies 2021, 14, 3577, 28 pages.
Final written decision of PGR2021-00102 dated Feb. 6, 2023.
Final written decision of PGR2021-00103 dated Feb. 6, 2023.

* cited by examiner

SYSTEMS AND METHODS UTILIZING TURBINE COMPRESSOR DISCHARGE FOR HYDROSTATIC MANIFOLD PURGE

CROSS REFERENCE TO RELATED APPLICATION

This application is a divisional of U.S. Non-Provisional application Ser. No. 15/929,770, filed May 21, 2020, titled "SYSTEMS AND METHODS UTILIZING TURBINE COMPRESSOR DISCHARGE FOR HYDROSTATIC MANIFOLD PURGE", which claims priority to and the benefit of U.S. Provisional Application No. 62/704,539, filed May 14, 2020, titled "AIR RECOVERY SYSTEMS AND METHODS TO UTILIZE TURBINE COMPRESSOR DISCHARGE PRESSURE", the entire disclosures of each of which are incorporated herein by reference.

TECHNICAL FIELD

The application relates generally to that of turbine engines having dual fuel manifold circuits and associated methods. More specifically, this application relates to dual fuel, dual shaft turbine engines for the high pressure pumping and hydraulic fracturing market, as well as power generation, manufacturing, healthcare, and agricultural machinery markets.

BACKGROUND

Traditionally turbine engines operate from a single fuel source; that fuel source being what is known as #2 diesel or gaseous fuels such as natural gas. The turbine industry recently has developed turbines that may accept dual fuels to combat redundancy and dependency of a single fuel source to be able to operate and allow for all relating operations to be carried out uninterrupted. In most dual fuel turbine engines, the ability to perform fuel switching is carried out by the need to shut down the engine and replace the fuel manifold with one designed for the desired fuel source. An example of this is the time consuming removal of a gaseous fuel manifold pipework and components and the re-installation of a liquid fuel manifold; this is an occurrence in some turbine engines supplied by manufacturers such as General Electric (GE) or Siemens. The issues involved with a turbine fuel manifold replacement include time consumption, the need for highly skilled personnel, specialized tooling, and the potential of disruption to other components in the turbine when performing the switch.

The detrimental factors involved with these fuel switching procedures has caused many turbine engine manufactures to develop turbine engines that may house a single distribution manifold and be supplied from two fuel sources; one being liquid fuel and the other being gaseous fuel respectively. This removed many of the problems associated with fuel switching on turbine engines and even allowed for fuel switching to be performed "on the fly". One condition that is still required to operate and perform such functions is the supply of a hydrostatic purge to the unused side of the turbine fuel manifold, thereby stopping exhaust gases from the "fuel in use" to enter the dormant fuel manifold and preventing damage and dirt ingress to components and pipework. The conventional way in which this hydrostatic purge is being performed is from an externally mounted air compressor that directs the generated air flow through a pneumatic intensifier system to increase the air pressure to that of the pressure of the exhaust gases and is then injected though a diverter valve that directs the flow to the fuel manifold that is in need of the purge.

SUMMARY

Applicant has recognized that despite this conventional hydrostatic purge being an effective and proven way to perform such an operation, the need for additional components and circuitry results in additional power consumption, additional space requirements, more machine consumables, and staged instrumentation to ensure that each sector of the system is producing the correct amount of pressure and flow to be able to meet the requirements of the fuel manifold.

Accordingly, Applicant discloses herein embodiments of systems, apparatuses, and methods to utilize turbine engine compressed air from a multi-stage compressor section of a turbine and direct the compressed air to the fuel manifold in an effort to reduce the dependency on external machinery and make the turbine fuel system more self-sustaining, for example. In one embodiment, for example, a system for the removal of compressed gas from a turbine compressor section is disclosed and includes an orifice fitting, a non-return valve, pressure reading instrumentation, actuated directional control valves and stainless-steel tubing to distribute the compressed air. The removal of compressed gas comes from a pre-drilled and tapped entry hole into the last compressor section that is positioned and sized so as not to disrupt regular turbine operation.

In another embodiment of a compressed air removal system, a system may include a variably flow control valve that is fed compressed air from the turbine section and adjusted to meet the demand of the fuel manifold while working in conjunction with previous components detailed above, for example.

In still another embodiment, a fuel manifold is disclosed to allow for receiving of compressor section air and allowing for the amount of compressed gas needed to be reduced resulting in less air flow removed from the compressor section. This, for example, allows more mass air flow to be delivered to the combustion chamber of the dual fuel dual shaft turbine engine.

In a further embodiment, a method for the storage of compressed air from the turbine compressor section is disclosed. This storage of compressed air may allow for onboard storage of high pressure compressed air on a hydraulic fracturing oilfield trailer and may be used to compensate for the pressure and flow variations of air supplied from the turbine during times of turbine start up, idle, and power disruption as will be understood by one skilled in the art.

In another embodiment, a dual fuel gas turbine engine includes a primary compressor, a combustion chamber, and a manifold pressurization system. The primary compressor has an inlet opening and an outlet opening. The combustion chamber is in fluid communication with the outlet opening of the primary compressor and is positioned to receive compressed air from the outlet opening of the primary compressor. The combustion chamber includes a first fuel manifold circuit and a second fuel manifold circuit. The combustion chamber has a first mode of operation in which the first fuel manifold circuit is configured to provide fuel to the combustion chamber and the second fuel manifold circuit is unused. The combustion chamber may have a second mode of operating in which the second fuel manifold circuit is configured to prevent fuel to the combustion chamber and the first fuel manifold circuit is unused. The manifold pressurization system includes a purge inlet, a common purge line, a first purge line, a second purge line, and a control valve. The purge inlet is in fluid communication with the primary compressor adjacent the outlet opening. The common purge line is connected at an upstream end to the purge inlet. The common purge line is configured to provide purge air at a purge pressure equal to or greater than a combustion pressure within the combustion chamber. The first purge line is connected at a downstream end thereof to the first fuel manifold circuit. The second purge line is connected at a downstream end thereof to the second fuel manifold circuit. The control valve is connected to a downstream end of the common purge line, an upstream end of the first purge line, and an upstream end of the second purge line. The control valve has a first position in which the control valve connects the common purge line with the second purge line to supply purge air to the second fuel manifold circuit. The control valve has a second position in which the control valve connects the common purge line with the first purge line to supply purge air to the first fuel manifold circuit. The control valve is in the first position when the combustion chamber is in the first mode of operation and in the second position when the combustion chamber is in the second mode of operation.

In some embodiments, the common purge line includes an orifice that is configured to limit a volume of air removed from the primary compressor. The orifice may be a fixed orifice and, in some embodiments, may be replaceably received within an orifice fitting such that a size of the fixed orifice is variable.

In certain embodiments, the primary compressor is a multistage compressor having a P3 point and the purge inlet may be positioned at the P3 point of the primary compressor.

In particular embodiments, the common purge line includes a plenum that is configured to store purge air. The common purge line may include a pneumatic intensifier that is configured to increase a pressure of purge air within the common purge line to the purge pressure.

In a further embodiment, a hydraulic fracturing pumping system includes an engine as detailed herein, a hydraulic fracturing pump, and a trailer. The hydraulic fracturing pump is connected to the engine such that the hydraulic fracturing pump I driven by the engine. The engine and the hydraulic fracturing pump may be mounted to the trailer.

In another embedment, a manifold pressurization system includes a purge inlet, a common purge line, a first purge line, a second purge line, and a control valve. The purge inlet is configured to receive purge air from a compressor of an engine. The common purge line is connected at an upstream end to the purge inlet. The common purge line is configured to provide purge air at a purge pressure. The first purge line is configured to connect at a downstream end thereof to a first fuel manifold circuit of the engine. The second purge line is configured to connect at a downstream end thereof to a second fuel manifold circuit of the engine. The control valve is connected to a downstream end of the common purge line, an upstream end of the first purge line, and an upstream end of the second purge line. The control valve has a first position in which the control valve connects the common purge line with the second purge line. The control valve has a second position in which the control valve connects the common purge line with the first purge line. The control valve is configured to selectively provide purge air to the first fuel manifold circuit or the second fuel manifold circuit to prevent backflow of air into the respective one of the first fuel manifold circuit or the second fuel manifold circuit.

In a further embodiment, a method of operating a duel fuel engine includes supplying a first fuel to a combustion chamber of an engine in a first mode of operation and switching the engine to a second mode of operation such that a second fuel is supplied to the combustion chamber, supplying combustion air to the combustion chamber with a primary compressor of the engine, diverting purge air from the primary compressor, positioning a direction control valve in a first position, and positioning the directional control valve in a second position. In the first mode of operation of the engine the first fuel may be supplied to the combustion chamber through a first fuel manifold circuit and no fuel may be supplied to the combustion chamber through a second fuel manifold circuit. Switching the engine to the second mode of operation may include the second fuel being supplied to the combustion chamber through the second fuel manifold circuit and no fuel being supplied to the combustion chamber through the first fuel manifold circuit. Diverting purge air from the primary compressor may include diverting air into a common purge line from the primary compressor via a purge inlet during operation of the engine. The purge air by be separated from the combustion air before the combustion chamber. Positioning the control valve in the first position may include positioning the control valve in the first position in the first mode of operation such that the diverted purge air flows into the second fuel manifold circuit at a purge pressure that is equal to or greater than a pressure within the combustion chamber such that backflow from the combustion chamber into the second fuel manifold circuit is prevented. Positioning the directional control valve in the second position may include positioning the control valve when the engine is in the second mode of operation such that the diverted purge air flows into the first fuel manifold circuit a purge pressure equal to or greater than a pressure within the combustion chamber such that backflow from the combustion chamber into the first fuel manifold circuit is prevented.

In embodiments, the method may include selecting a fixed orifice based on a pressure of the primary compressor and fitting the selected fixed orifice in the common purge line to limit a volume of air diverted from the primary compressor.

BRIEF DESCRIPTION OF THE DRAWINGS

The accompanying drawings, which are included to provide a further understanding of the embodiments of the present disclosure, are incorporated in and constitute a part of this specification, and together with the detailed description, serve to explain the principles of the embodiments discussed herein. The present disclosure may be more readily described with reference to the accompanying drawings.

DETAILED DESCRIPTION

Figure 1:
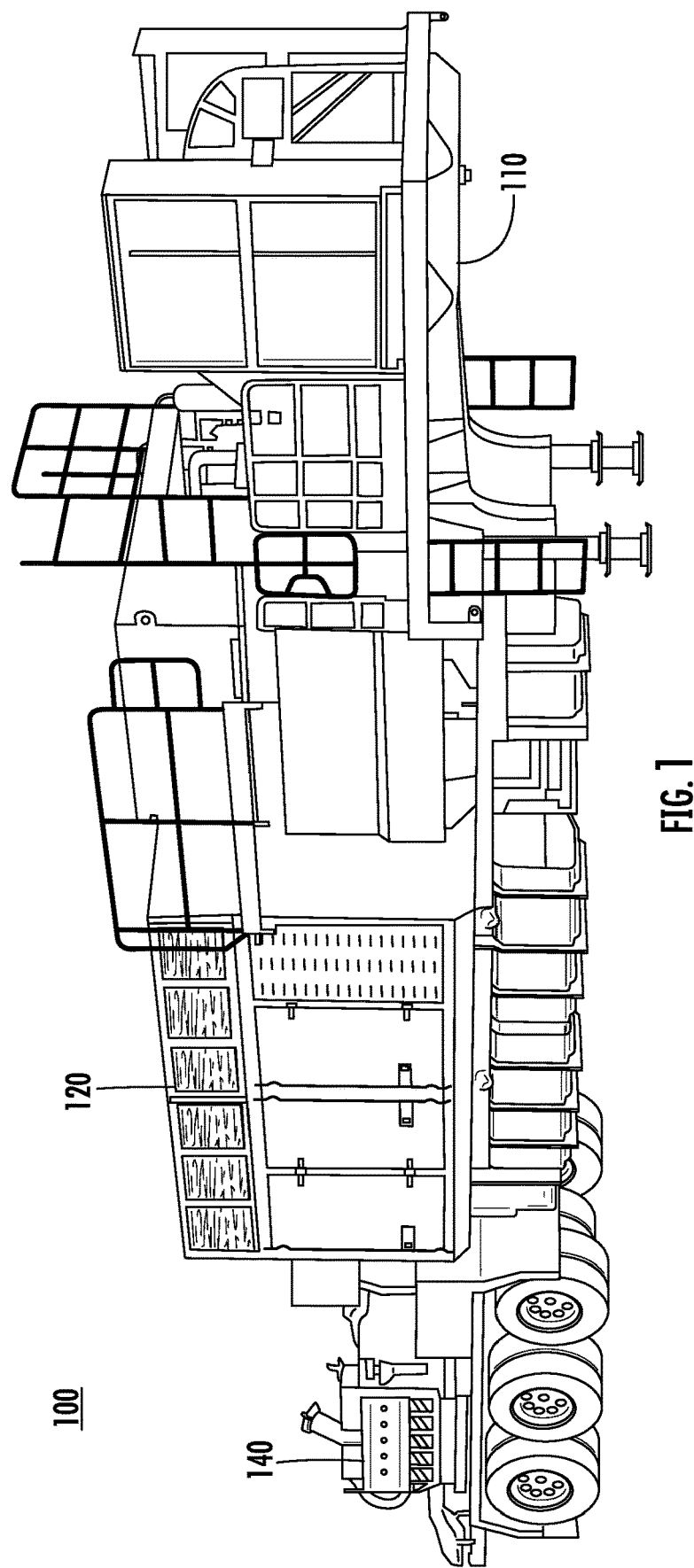
FIG. 1 is a perspective view of a mobile power unit according to embodiments of the disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect may be combined with features from any other embodiment or aspect in any appropriate combination. For example, any individual or collective features of method aspects or embodiments may be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

The embodiments of the present disclosure are directed to mobile power units, for example, mobile power units that are mounted to a transportation platform that are transportable on and off highways. In particular, embodiments of the present disclosure are directed to manifold pressurization systems that are mounted to a transportation platform with a mobile power unit. The manifold pressurization systems disclosed herein utilize air from a compressor of the engine to purge an unused manifold circuit of the engine. In some embodiments, for example, the manifold pressurization systems may hydrostatically purge the unused manifold circuits of the engine.

FIG. 1 illustrates an exemplary mobile power unit 100 is provided in accordance with an embodiment of the present disclosure. The exemplary mobile power unit 100 includes transportation platform 110, an engine 120, and a power unit 140. The transportation platform 110 is shown as a single trailer with the entire mobile power unit 100 and components thereof mounted thereto. For example, it may be advantageous to have the entire mobile power unit 100 mounted to a single trailer such that setup and startup of the mobile power unit 100 does not require onsite assembly of the mobile power unit 100. In addition, mounting the entire mobile power unit 100 to a single trailer may decrease a footprint of the mobile power unit 100. The transportation platform 110 may be a trailer that may be pulled by a tractor (not shown) on and off public highways. In some embodiments, the transportation platform may include more than one trailer.

The engine 120 is mounted to the transportation platform 110 and may be any suitable engine including, but not limited to, an internal combustion engine or a gas turbine engine. The engine 120 may be a dual fuel engine operating on gasoline, natural gas, well gas, field gas, diesel, and/or other suitable fuel. In some embodiments, the engine 120 may be a dual fuel engine operating on a liquid fuel and a gaseous fuel. In certain embodiments, the engine 120 is a dual fuel gas turbine engine that asynchronously operates on diesel fuel, e.g., #2 diesel as will be understood by those skilled in the art, and on a gaseous fuel, e.g., natural gas, well gas, or field gas. In particular embodiments, the engine 120 is a dual fuel, dual shaft gas turbine engine that operates on a liquid fuel such as diesel fuel and a gaseous fuel such as natural, well gas, or field gas.

Figure 2:
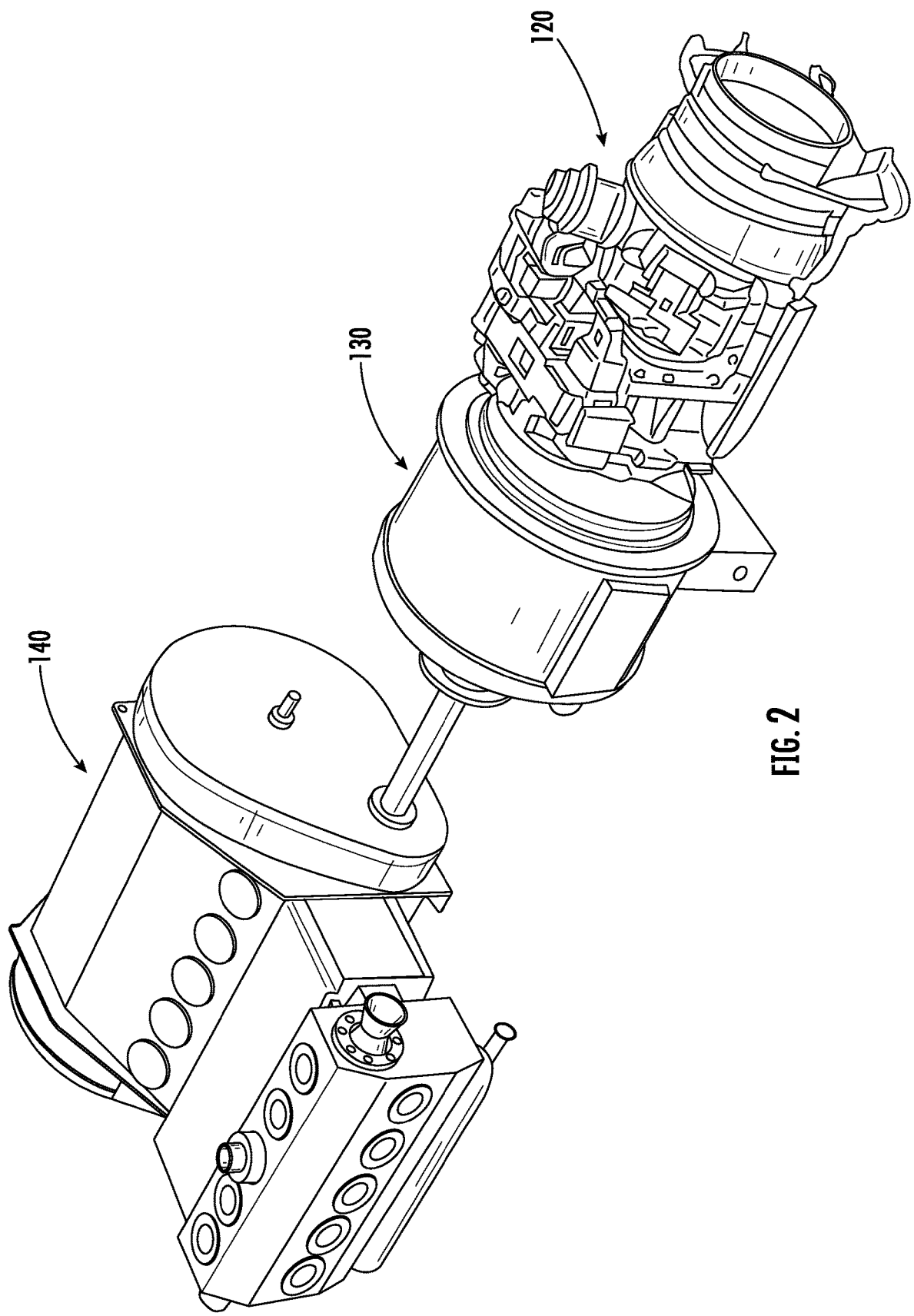
FIG. 2 is a perspective view of a turbine engine being used to drive a fracturing pump according to embodiments of the disclosure.

FIG. 2 illustrates an exemplary engine 120 and power unit 140 configuration provided in accordance with an embodiment of the present disclosure. The engine 120 is operably coupled to the power unit 140 such that the engine 120 drives the power unit 140 to supply power to a system external of the mobile power unit 100. As shown, the power unit 140 is a high pressure pump, such as those that include hydraulic fracturing pumps, that is configured to supply power in the form of high pressure fluid. The power unit 140 may be a high pressure single acting reciprocating pump or a high pressure centrifugal pump. In certain embodiments, the power unit 140 may be a generator configured to produce electric power. The engine 120 may be operably coupled to the power unit 140 by a gearbox 130. The gearbox 130 may decrease a speed of an input from the engine 120 while increasing a torque or increase the speed of an input from the engine 120 while decreasing a torque. In some embodiments, the gearbox 130 is a transmission that allows for adjustment of the ratio between a speed of rotation of the input from the engine 120 to a speed of rotation of the power unit 140. In certain embodiments, the transmission has a set number of speed ratios. In particular embodiments, the transmission is continuously variable through a wide range of speed ratios. Other variations of pump, drive shaft, gearbox, and turbine may be used with the achieved goal of high volume, high pressure fluid delivery being achieved as will be understood by those skilled in the art. As will be appreciated, turbine engines are a type of high RPM (rotations per minute) prime mover which are optimized to produce high shaft horse power (SHP) in relevance to their compact size.

Figure 3:
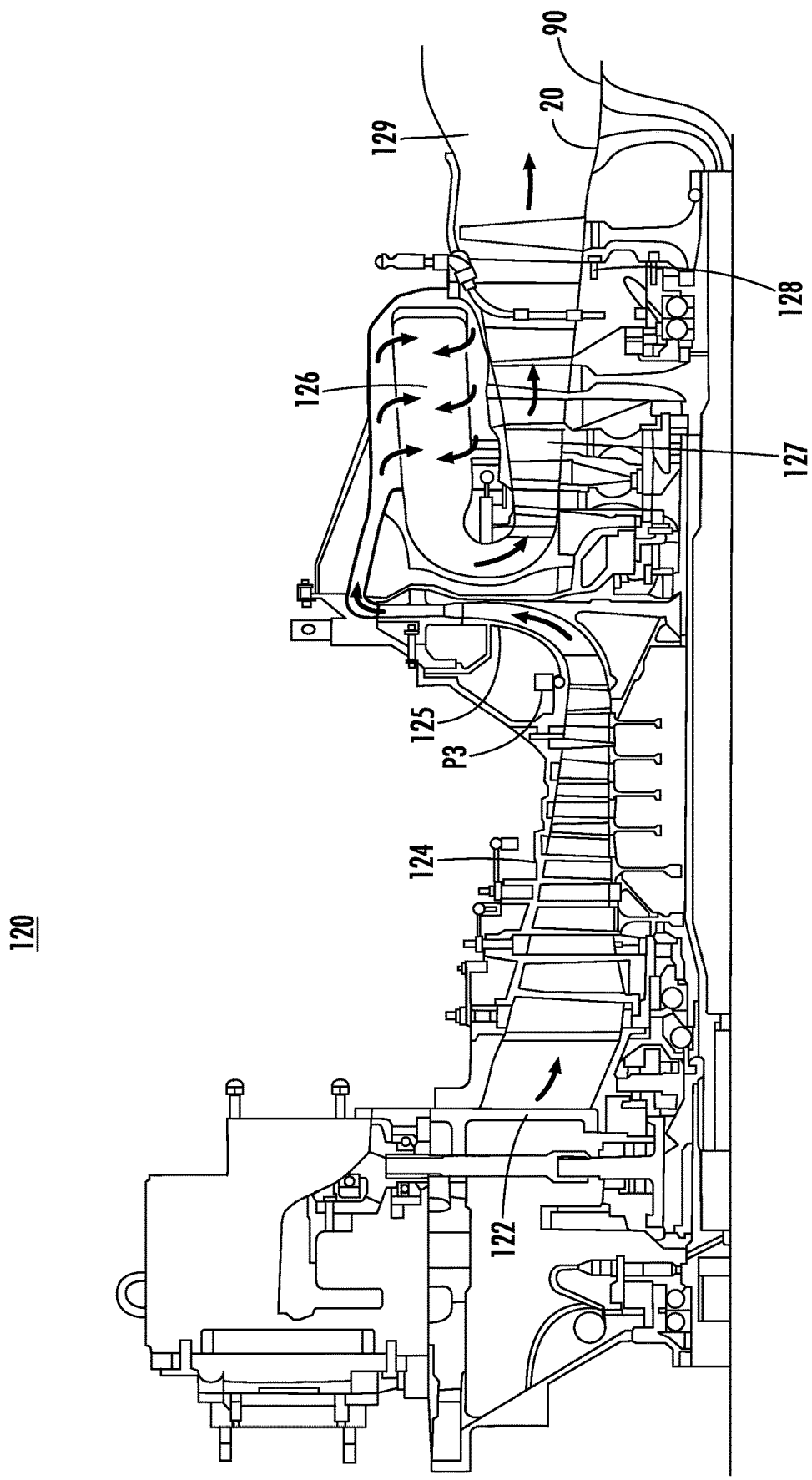
FIG. 3 is a schematic diagram which highlights the turbine compressor sections of a dual shaft turbine engine according to embodiments of the disclosure.

FIG. 3 illustrates a schematic of an exemplary engine 120 shown as a dual-shaft gas turbine engine. The engine 120 includes an intake 122, an axial compressor 124, a radial compressor 125, a combustion chamber 126, a producer turbine 127, a power turbine 128, and an exhaust duct 129 as will be understood by those skilled in the art. As air moves through the compressors 124, 125 from the intake 122 to the combustion chamber 126, the pressure of the air is increased. As the air moves through the combustion chamber 126, fuel is mixed with the air and ignited such that the temperature of the air is increased. As the air flows through the producer and power turbines 127, 128 the pressure of the air is decreased as the air rotates the turbines 127, 128. The air continues through engine 120 and out the exhaust duct 129 to be released to the environment.

Figure 4:
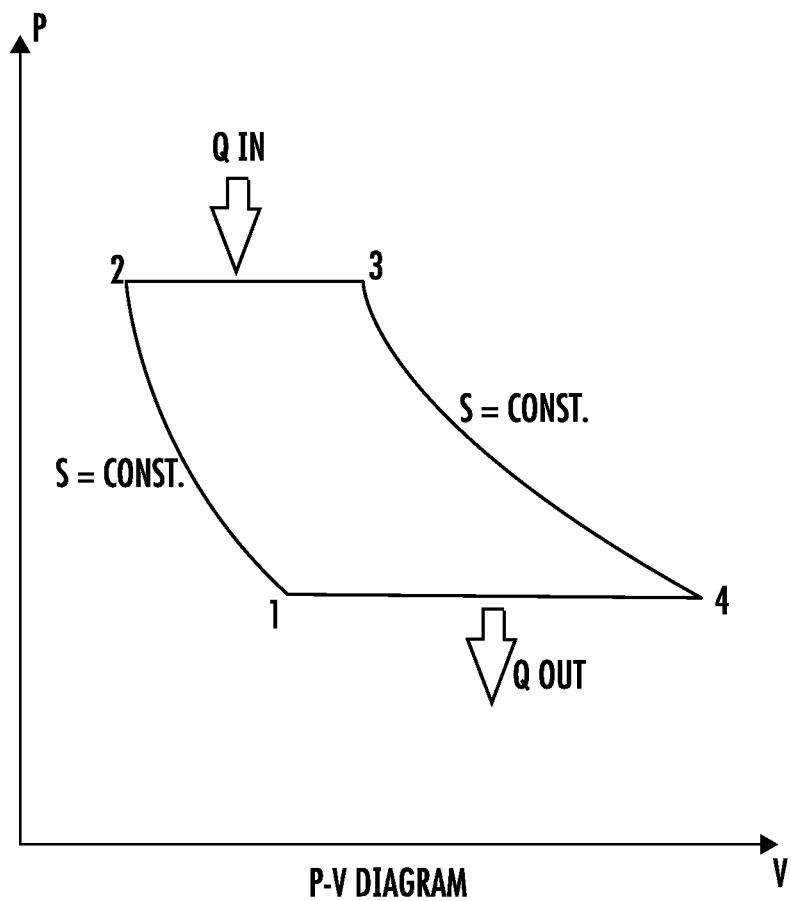
FIG. 4 is a 2-axis Pressure (P) versus volume (v) graph and diagram demonstrating the Brayton Cycle for a Turbine Engine according to embodiments of the disclosure.

FIG. 4, for example, demonstrates the Brayton cycle for a turbine engine for which the prime working media of a turbine is air and the conditions in which air enters the compressor section of the turbine engine directly correlates to the amount of SHP a turbine engine, e.g., engine 120, may produce. At point 1, air is drawn into the turbine inlet or intake. At point 2 the air has been compressed resulting in a pressure increase and a reduction in volume. From point 2 to point 3 the air is passed into the combustion chamber 126. As the air is passed from point 2 to point 3, the turbine extracts power from the hot high pressure air that is generated from the air and fuel combustion mixture resulting in a drop in pressure but a drastic increase in volume. This combusted or exhaust air is then exhausted out of the turbine from point 4 to 1 where the cycle repeats itself for the duration of the operation of the turbine.

Figure 5:
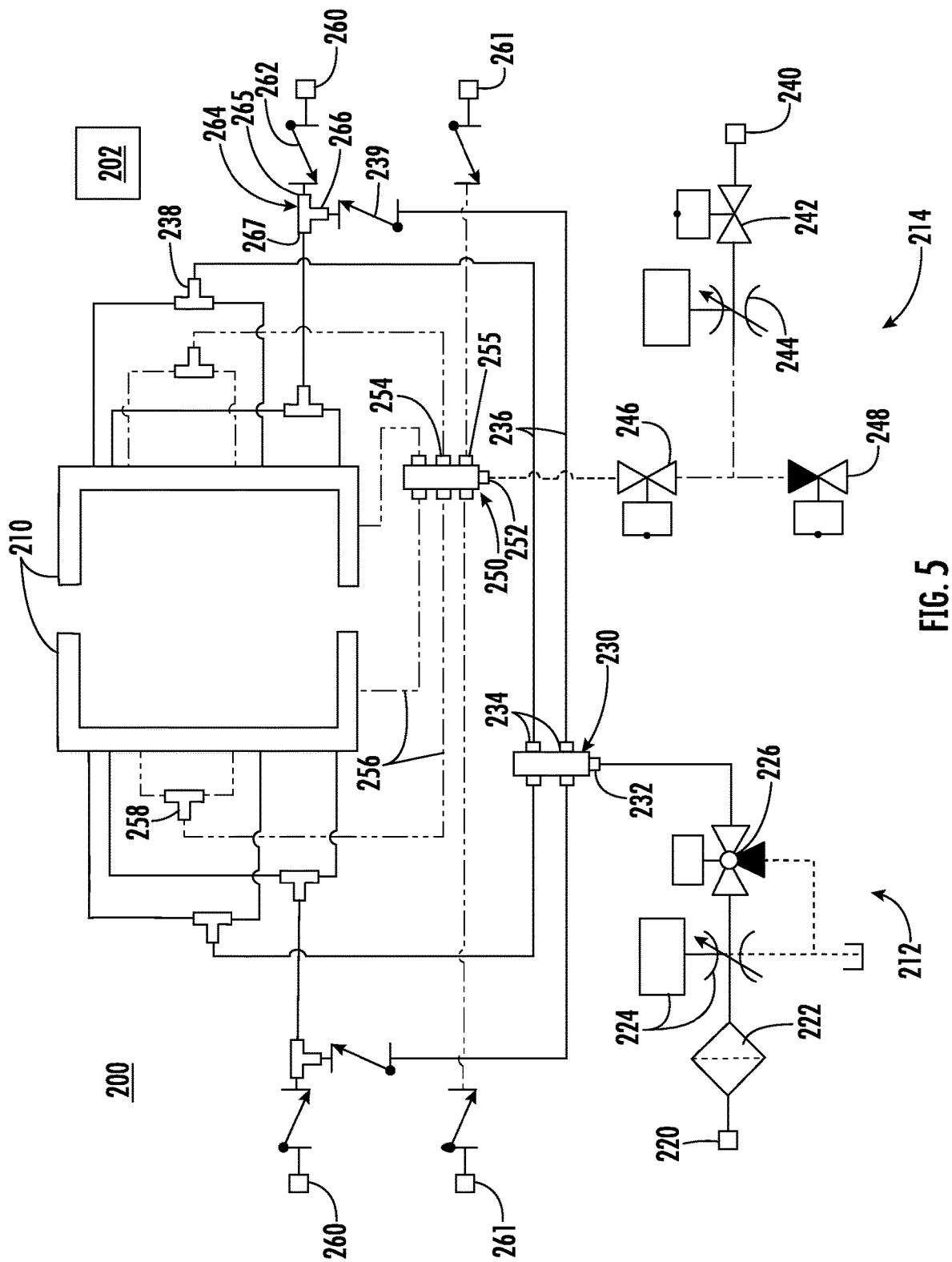
FIG. 5 is a schematic diagram that illustrates pipework and components of a dual fuel turbine engine according to embodiments of the disclosure.

FIG. 5 illustrates an exemplary dual fuel delivery circuits 200 provided in accordance with the present disclosure. The dual fuel delivery circuits 200 is configured to selectively provide a liquid fuel or a gaseous fuel to a combustion chamber of an engine, e.g., engine 120. The dual fuel delivery circuits 200 includes inputs of a liquid fuel, a gaseous fuel, and purge air and outputs substantially all of the inputs through the fuel distribution manifolds 210 as detailed below. It will be appreciated by one skilled in the art that a portion of the liquid fuel and the gaseous fuel may be returned to a fuel reservoir or the environment as detailed below.

Starting with the first or liquid fuel manifold circuit 212 of the fuel delivery circuits 200, the liquid fuel manifold circuit 212 includes a liquid fuel inlet 220 that receives liquid fuel from a liquid fuel reservoir (not explicitly shown). The liquid fuel reservoir may include a fuel pump (not shown) that pressurizes the liquid fuel for use within the liquid fuel manifold circuit 212. From the liquid fuel inlet 220, the liquid fuel flows through a fuel filter 222, a liquid fuel metering valve 224, and a liquid fuel control valve 226. At the liquid fuel metering valve 224 and the liquid fuel control valve 226, excess liquid fuel may be directed out of the fuel delivery circuits 200 and returned to the liquid fuel reservoir. The liquid fuel control valve 226 has a supply or first position in which the liquid fuel control valve 226 supplies liquid fuel from the liquid fuel metering valve 224 to a liquid fuel distribution block 230 and a divert or second position in which the liquid fuel control valve 226 directs fuel from the liquid fuel metering valve 224 back to the fuel reservoir. The liquid fuel control valve 226 may include solenoid that switches the liquid fuel control valve 226 between the first and second positions thereof. For example, the solenoid may have an off or deactivated condition corresponding to the second position of the liquid fuel control valve 226 and an on or activated condition corresponding to the first position of the liquid fuel control valve 226. The solenoid may be adjustable between the activated and deactivated condition such that the liquid fuel control valve 226 is between the supply and divert positions thereof. The liquid fuel metering valve 224 may be electrically controlled to control a flow, e.g., an amount, of liquid fuel into the fuel delivery circuits 200.

The liquid fuel distribution block 230 receives liquid fuel through a block inlet 232 and distributes the liquid fuel through two or more block outlets 234. Each of the block outlets 234 is in fluid communication with a fuel manifold 210 by the way of one or more liquid fuel lines 236. The individual liquid fuel lines 236 may extend from the liquid fuel distribution block 230 directly to one of the fuel manifolds 210 or may pass through one or more additional components of the fuel delivery circuits 200. As shown, one of the liquid fuel lines 236 may pass through a tee 238 such that the liquid fuel line 236 is divided from one liquid fuel line 236 into two liquid fuel lines 236 that extend from the tee 238 to the fuel manifold 210. A tee 238 may divide a single liquid fuel line 236 into two or more liquid fuel lines 236. Additionally, or alternatively, a liquid fuel line 236 may pass through a check valve 239 and then into a tee 264 before continuing towards the fuel manifold 210. The check valve 239 allows for flow through the liquid fuel line 238 downstream, e.g., towards the fuel manifold 210, and prevents backflow within the liquid fuel line 238, e.g., towards the distribution block 230. The tee 264 will be detailed below with respect to the purge air portion of the fuel delivery circuits 200.

Continuing to refer to FIG. 5, the second or gaseous fuel manifold circuit 214 of the fuel delivery circuits 200 is detailed in accordance with an embodiment of the present disclosure. The gaseous fuel manifold circuit 214 includes a gaseous fuel inlet 240 that receives gaseous fuel from a gaseous fuel source (not explicitly shown). The gaseous fuel source may be a pipeline, a well, or a storage tank, as understood by one skilled in the art. The gaseous fuel source may be pressurized or may include a gaseous fuel pump or intensifier to pressurize the gaseous fuel. From the gaseous fuel inlet 240, the gaseous fuel flows through a primary gaseous fuel valve 242, a gaseous fuel metering valve 244, a secondary gaseous fuel control valve 246, and a bleed valve 248. The primary gaseous fuel control valve 242 has a supply or first position in which the primary gaseous fuel control valve 242 supplies gaseous fuel to the gaseous fuel metering valve 244 and a closed or second position in which the primary gaseous fuel control valve 242 prevents gaseous fuel from entering the fuel delivery circuits 200. The gaseous fuel metering valve 244 may be electrically controlled to control a flow, e.g., an amount, of gaseous fuel into the fuel delivery circuits 200. The primary gaseous fuel control valve 242 may include a solenoid that transitions the primary gaseous fuel control valve 242 between the first and second positions thereof. The deactivated condition of the solenoid may correspond to the closed position of the primary gaseous fuel control valve 242.

The secondary gaseous control valve 246 is downstream of the gaseous fuel metering valve 244. The secondary gaseous control valve 246 has a supply or first position in which the secondary gaseous control valve 246 supplies gaseous fuel to a gaseous fuel hub 250 and a closed or second position in which the secondary gaseous control valve 246 prevents gaseous fuel from entering the gaseous fuel hub 250. The secondary gaseous control valve 246 may include a solenoid that transitions the secondary gaseous control valve 246 between the first and second positions thereof. The deactivated condition of the solenoid may correspond to the closed position of the secondary gaseous control valve 246.

The bleed valve 248 is downstream of the gaseous fuel metering valve 244 and upstream of the secondary gaseous control valve 246 but is out of a direct flow path between the gaseous fuel metering valve 244 and the secondary gaseous control valve 246. The bleed valve 248 has a bleed or first position in which the bleed valve 248 diverts gaseous fuel from the secondary gaseous control valve 246 and a closed or second position in which the secondary gaseous control valve 246 prevents gaseous fuel from exiting the fuel delivery circuits 200. The bleed valve 248 may include a solenoid that transitions the bleed valve 248 between the first and second positions thereof. The deactivated condition of the solenoid may correspond to the closed position of the bleed valve 248. Diverting the gaseous fuel from the secondary gaseous control valve 246 may include returning the gaseous fuel to the supply of gaseous fuel, releasing the gaseous fuel to the environment, diverting the gaseous fuel to a storage tank, or delivering the gaseous fuel to a distribution network, e.g., a pipeline, as will be understood by one skilled in the art.

The gaseous fuel distribution block 250 receives gaseous fuel through a block inlet 252 and distributes the gaseous fuel through two or more block outlets 254. The gaseous fuel distribution block 250 also includes a purge inlet 255 that is in fluid communication with a purge inlet 260 as detailed below with respect to the purge air side of the fuel delivery circuits 200. Each of the block outlets 254 is in fluid communication with a fuel manifold 210 by the way of one or more gaseous fuel lines 256. The individual gaseous fuel lines 256 may extend from the gaseous fuel distribution block 250 directly to one of the fuel manifolds 210 or may pass through one or more additional components of the fuel delivery circuits 200. As shown, one of the gaseous fuel lines 256 may pass through a tee 258 such that the gaseous fuel line 256 is divided from one gaseous fuel line 256 into two gaseous fuel lines 256 that extend from the tee 258 to the fuel manifold 210. A tee 258 may divide a single gaseous fuel line 256 into two or more gaseous fuel lines 256.

Still referring to FIG. 5, the fuel delivery circuits 200 receives purge air as detailed in accordance with an embodiment of the present disclosure. The liquid side purge inlet 260 is in fluid communication with a first purge line 60 (FIG. 6) and the gas side purge inlet 261 is in fluid communication with a second purge line 70 (FIG. 6), which are described in detail below.

The liquid fuel manifold circuit 212 includes a check valve 262 downstream of each of the liquid side purge inlet 260. The check valve 262 allows flow of purge air downstream, e.g., towards the fuel manifolds 210, and prevents flow upstream. The liquid side purge inlet 260 is in fluid communication with a tee air inlet 265 of the tee 264. The tee 264 also includes a tee liquid inlet 266 that is in fluid communication with the liquid fuel block 230 such that liquid fuel is supplied to the tee 264. The tee 264 further includes a tee outlet 267 that flows downstream to the fluid manifold 210 such that purge air and/or liquid fuel from the tee 264 flows into the fuel manifold 210. When the liquid side purge inlet 260 receives purge air, the purge air flows through the tee 264 such that liquid fuel downstream of the tee 264 flows into the fuel manifold 210 and the fuel manifold 210 is filled with purge air such that exhaust gases from the combustion chamber 126 and gaseous fuel from the fuel manifolds 210 are prevented from flowing upstream into the liquid fuel manifold circuit 212 of the fuel delivery circuits 200 when liquid fuel is not being supplied to the fuel manifolds 210.

The gaseous fuel manifold circuit 214 includes a check valve 262 downstream of each of the gaseous side purge inlet 261. The check valve 262 allows flow of purge air downstream, e.g., towards the fuel manifolds 210, and prevents flow upstream. The gas side purge inlet 261 is in fluid communication with the gaseous fuel distribution block 250 such that purge air flows downstream from the gas side purge inlet 261 into the gaseous fuel distribution block 250 via the purge inlet 255. When the gas side purge inlet 261 receives purge air, the purge air flows into the gaseous fuel distribution block 250 such that gaseous fuel downstream of the gaseous fuel distribution block 250 flows into the fuel manifold 210 from the gaseous fuel manifold circuit 214 of the fuel delivery circuits 200 is filled with purge air such that exhaust gases from the combustion chamber 126 and liquid fuel within the fuel manifolds 210 are prevented from flowing upstream into the gaseous fuel manifold circuit 214 of the fuel delivery circuits 200 when gaseous fuel is not being supplied to the fuel manifold 210.

The components of the fuel delivery circuits 200, e.g., valves 224, 226, 242, 244, 246, and 248, may be controlled by a controller 202. The controller 202 may be part of an engine controller of the engine 120 or may be a separate subcontroller of the fuel delivery circuits 200. The controller 202 may receive and provide signals to one or more other controllers as will be appreciated by one skilled in the art.

As detailed above, in some prior art purge air systems, the purge air is provided to the liquid side purge inlet 260 and the gaseous side purge inlet 261 from a pneumatic intensifier apparatus which takes in air at atmospheric pressure and increases the pressure to a purge pressure that is greater than a pressure of the exhaust gases within the combustion chamber 126. Such a pneumatic intensifier apparatus takes up significant space and requires additional power inputs to power the pneumatic intensifier apparatus. The manifold pressurization systems detailed below in accordance with an embodiments of the present disclosure receive air at a pressure significantly higher than atmospheric pressure and in some instances at or above the purge pressure such space and/or power requirements required for a pneumatic intensifier apparatus is reduced or eliminated from mobile power unit 10 (FIG. 1). This space savings may allow for a reduced size of the mobile power unit 10 or for additional components of the mobile power unit 10 to be mounted to a single transportation platform 110.

Figure 6:
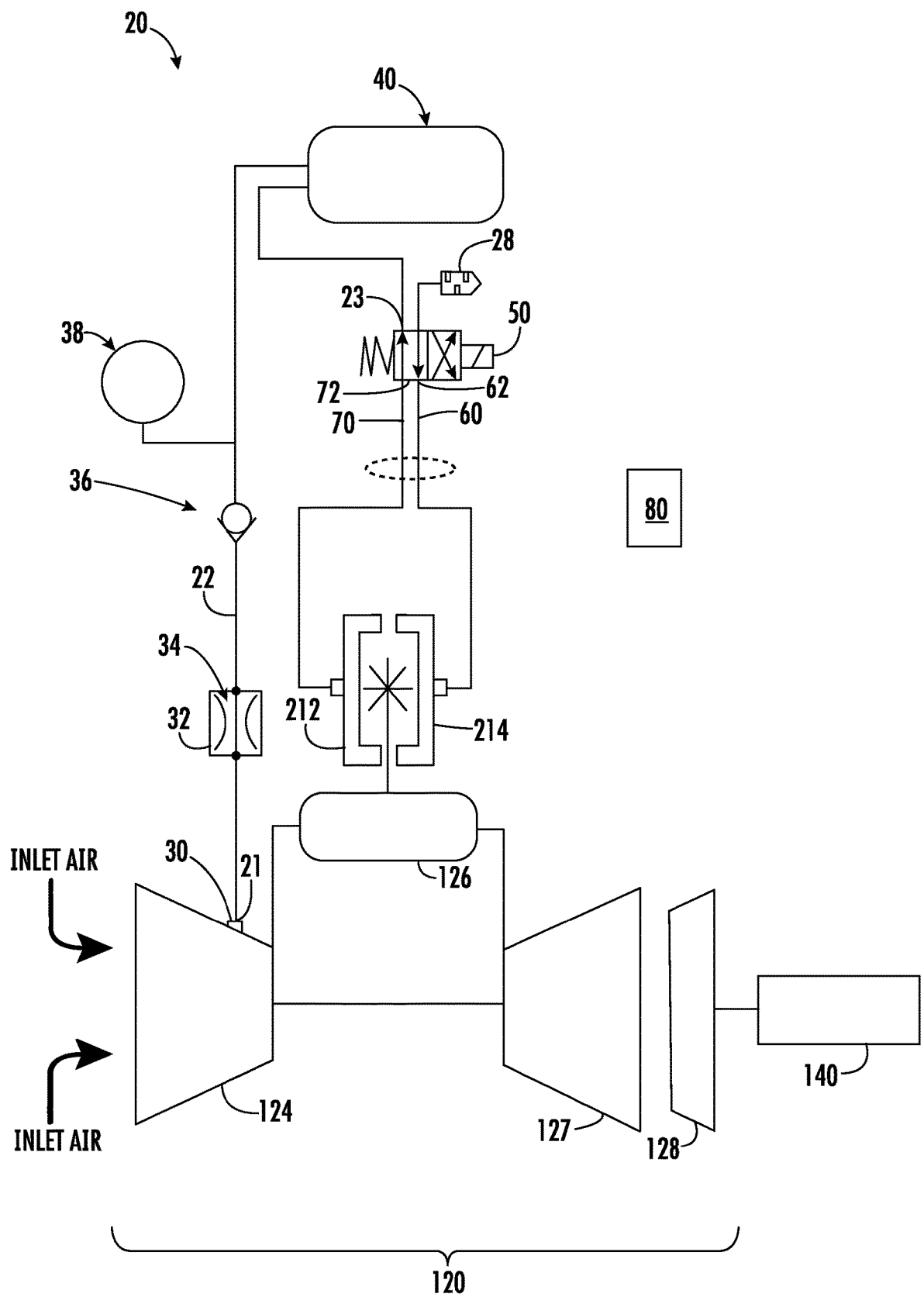
FIG. 6 is a schematic diagram that illustrates an example of a fuel purge and air recovery system according to embodiments of the disclosure.

FIG. 6 illustrates a manifold circuit pressurization system 20 provided in accordance with embodiments of the present disclosure which is mounted to an engine, e.g., engine 120. The manifold circuit pressurization system 20 includes a common purge line 22, a first purge line 60, and a second purge line 70. The common purge line 22 has an upstream end 21 and a downstream end 23 and includes, from the upstream end 21 to the downstream end 23, a purge inlet 30, and a control valve 50. The common purge line 22 receives compressed air from a compressor of the engine 120 through the purge inlet 30. As shown, the purge inlet 30 is positioned adjacent an outlet of the primary compressor 124, e.g., at the last compressor section of the primary compressor 124. In embodiments, the purge inlet 30 is positioned at a P3 take off point of the primary compressor 124. In certain embodiments, the purge inlet 30 uses an existing P3 take off designed for a pressure transducer of the primary compressor 124 as the purge inlet 30 for the manifold circuit pressurization system 20. It will be appreciated by one skilled in the art that the P3 take off of a compressor is a point where the pressure of the air within the compressor is at its highest and the volume of the air is at its smallest within the compressor, e.g., point 2 of the Brayton Cycle of FIG. 4. As the pressure of the purge air entering the manifold circuit pressurization system 20 is already at a pressure substantially equal to the highest pressure within the engine 120, including the pressure within the combustion chamber 126, the manifold circuit pressurization system 20 may be provided without a pneumatic intensifier. The purge air inlet 30 is sized to not disrupt regular turbine operation.

The purge inlet 30 may include a valve that has an open position in which the purge inlet 30 allows for air to flow into the common air line 22 and closed position in which the air is prevented from flowing into the common air line 22. The valve of the purge inlet 30 may be a variable valve that is in electrical or wireless communication with a controller 80. The controller 80 may receive a signal from a pressure sensor 38 associated with the common purge line downstream of the purge inlet 30. The controller 80 may control a position of the valve of the purge inlet 30 in response to a pressure within the common purge line 22. The controller 80 may have a predetermined purge pressure programed therein that is a desired pressure of purge air within the common purge line 22. Additionally or alternatively, the controller 80 may receive a pressure within the combustion chamber 126 from a sensor within the combustion chamber 126 and/or a controller of the engine 120. The controller 80 may control the valve of the purge inlet 30 in response to a pressure within the combustion chamber 126. The controllers detailed herein, e.g., controllers 80, 202, may be commonly programmable logistical controllers (PLC), micro controllers, and/or off highway controllers.

The common purge line 22 may include an orifice 34 downstream of the purge inlet 30 that limits a volume of air drawn from the compressor 124 such that the air diverted to the common purge line 22 does not have a detrimental effect on the overall efficiency of the primary compressor 124 and thus the engine 120. The orifice 34 may be a variable orifice or valve that is configured to control an amount of air drawn into the common purge line 22 from the primary compressor 124. The orifice 34 may be controlled by the controller 80 in response to a pressure within the common purge line 22, downstream of the orifice 34 and/or a pressure within the combustion chamber 126 in a manner similar to control of the valve of the purge inlet 30 detailed above.

Figure 7:
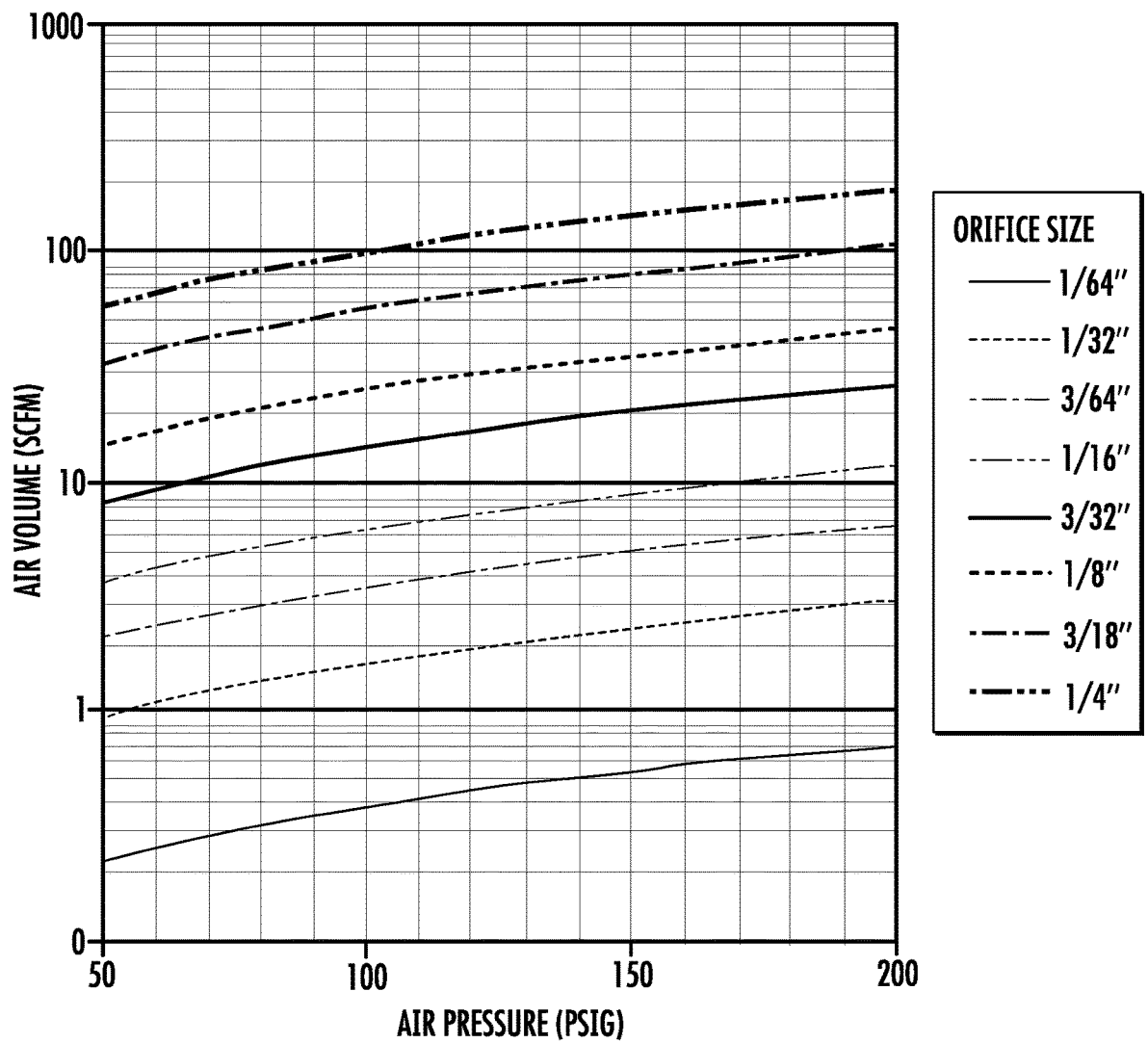
FIG. 7 is a 2-axis graph of air volume versus air pressure which shows the allowable air flow through an orifice given pressure and orifice size according to embodiments of the disclosure.

In some embodiments, the orifice 34 may be a fixed orifice that limits a volume of air drawn from the primary compressor 124 such that the air diverted to the common purge line 22 does not have a detrimental effect on the overall efficiency of the compressor 124 and thus the engine 120. FIG. 7 illustrates a volume of air that passes through a fixed orifice having a variety of sizes base on an air pressure within the common purge line 22. As shown in FIG. 7, the fixed orifice 34 may be sized, e.g., an opening of the fixed orifice, in a range of 1/64 of an inch to 1/4 of an inch. The orifice 34 may be fixed within the common purge line 22 based on properties of the compressor 124 and/or engine 120. In some embodiments, the common purge line 22 may include an orifice fitting 32 that removably receives the fixed orifice 34. The orifice fitting 32 may allow for the fixed orifice 34 to be varied or replaced based on operating parameters of the compressor 124 and or engine 120. For example, if the compressor 124 is operating below an optimum pressure, the size of the fixed orifice 34 may be increased to allow more air into the common purge air line 22 or may be decreased to allow less air into the common purge air line 22.

The manifold pressurization system 20 may include the valve of the purge inlet 30, the orifice 34 (variable or fixed), or both the valve of the purge inlet 30 and the orifice 34 (variable or fixed). The pressure sensor 38 is positioned within the common purge line 22 downstream of purge inlet 30 and/or the orifice 34. The pressure sensor 38 may measure a pressure within the common purge line 22 and may transmit a signal indicative of the pressure within the common purge line 22 to one or more controllers associated with the engine 120, e.g., controller 80 or controller 202 (FIG. 4).

The common purge line 22 may include a check valve 36 between purge inlet 30 and the control valve 50. When the common purge line 22 includes an orifice 34, the check valve 36 may be downstream of the orifice 34. The check valve 36 allows air within the common purge line 22, e.g., purge air, to flow downstream towards the control valve 50 and prevents air within the common purge line 22 from backflowing upstream towards and into the compressor 124.

The common purge line 22 may include a purge air reservoir 40 downstream of the check valve 36. The purge air reservoir 40 may store purge air at purge pressure upstream of the control valve 50. The purge air reservoir 40 may stabilize a pressure within the common purge line 22 due to fluctuations of pressure from the compressor 124. For example, the purge air reservoir 40 may compensate for pressure and flow variations of air supplied from the primary compressor 124 during start up, idle, and/or power disruption. Additionally, or alternatively, the purge air reservoir 40 may provide purge air to the control valve 60 when the purge inlet 30 is in a closed position. The purge air reservoir 40 may provide purge air to the control valve 50 when the compressor 124 is not operating. For example, the purge air reservoir 40 may provide purge air to the control valve 50 to purge the fuel manifold circuits 200 when the primary compressor 124 is not operating.

Continuing to refer to FIG. 6, the control valve 50 is in fluid communication with a downstream end 23 of the common purge line 22, an upstream end 62 of the first purge line 60, and an upstream end 72 of the second purge line 70. Downstream flow within the common valve 50 is from the common purge line 22 into the first or second purge line 60, 70. The control valve 50 has a first position in which the control valve 50 connects the common purge line 22 with the first purge line 60 such that the common purge line 22 is in fluid communication with the gaseous or second fuel manifold circuit 214. In the first position of the control valve 50, the control valve 50 may connect the upstream end 62 of the second purge line 60 to a pressure relief valve 28. The control valve 50 also has a second position in which the control valve 50 connects the common purge line 22 with the second purge line 70 such that the common purge line 22 is in fluid communication with the liquid or first fuel manifold circuit 212. In the second position of the control valve 50, the control valve 50 may connect the upstream end 72 of the second purge line 70 to the pressure relief valve 28. The control valve 50 may have a third position in which the common purge line 22 is not in fluid communication with either of the first purge line 60 or the second purge line 70. In the third position, the first and/or the second purge line 60, 70 may be in fluid communication with the pressure relief valve 28. The pressure relief valve 28 may remain in a closed position to prevent air in fluid communication therewith from escaping the manifold pressurization system 20 and may have an open position in which the pressure relief valve 28 releases pressure in fluid communication therewith to the environment. The pressure relief valve 28 may release pressure to prevent excess pressure within the fluid manifold circuits 212, 214.

The position of the control valve 50 is controlled by the controller 80. Specifically, when the engine 120 is in a first mode of operation in which it receives fuel from the first manifold circuit 212, the controller 80 positions the control valve 50 in the first position such that purge air is provided to the second manifold circuit 214. When the engine 120 is in the second mode of operation in which it receives fuel from the second manifold circuit 214, the controller 80 positions the control valve 50 in the second position such that purge air is provided to the first manifold circuit 212. Providing the purge air to a respective one of the first or second manifold circuits 212, 214 prevents exhaust gasses from within the combustion chamber 126 from flowing into an unused manifold circuit 212, 214, e.g., a manifold circuit not providing fuel to the combustion chamber 126.

The components of the manifold pressurization system 20, e.g., the purge inlet 30, the pressure sensor 38, and the control valve 50, may be controlled by the controller 80. The controller 80 may be part of an engine controller of the engine 120 or may be a separate subcontroller of the manifold pressurization system 20. The controller 80 may receive and provide signals to one or more other controllers as will be appreciated by one skilled in the art.

Figure 8:
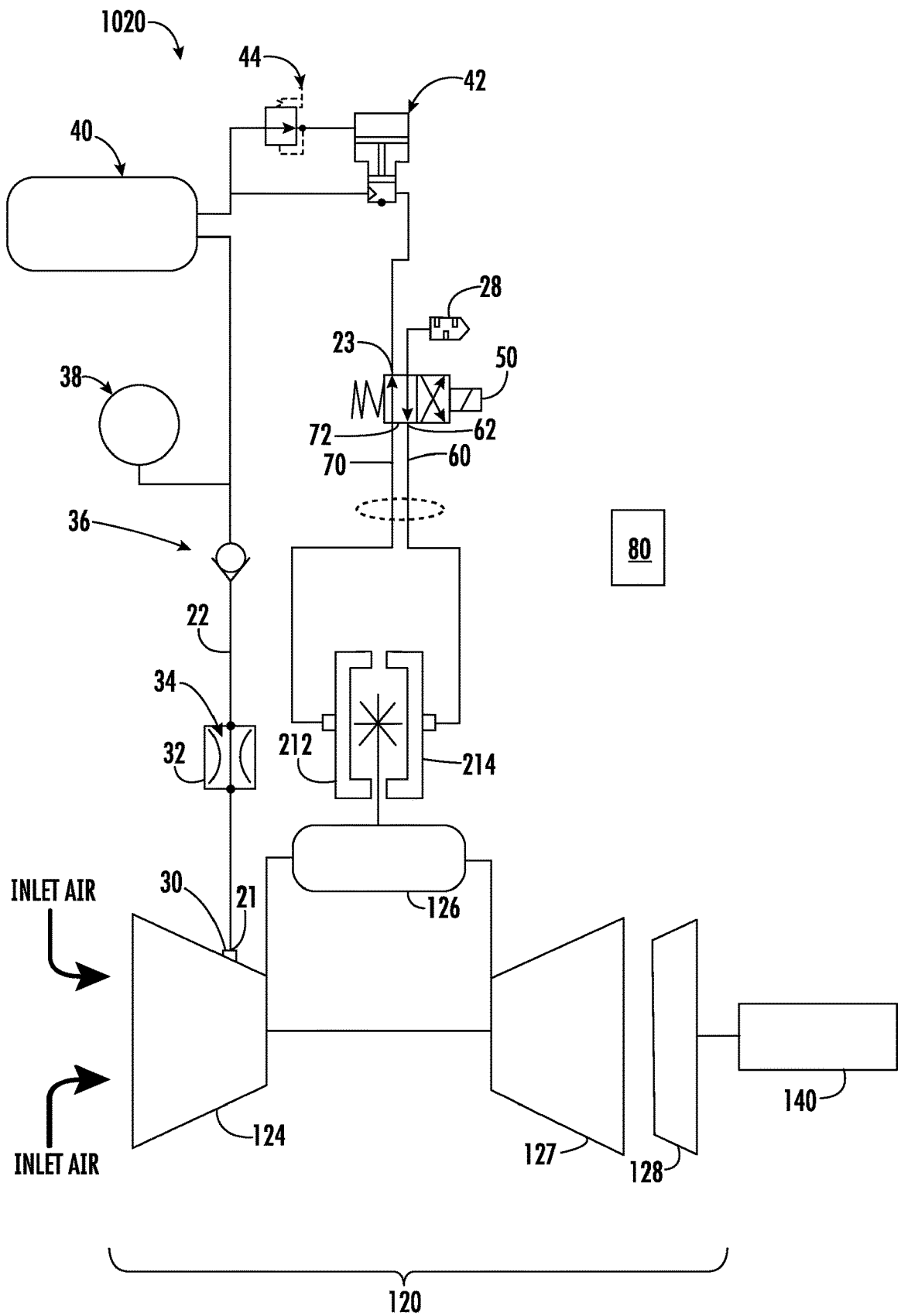
FIG. 8 is a schematic diagram a fuel purge and air recovery system with the inclusion of a pneumatic intensifier according to embodiments of the disclosure.

FIG. 8 illustrates another manifold pressurization system 1020 provided in accordance with an embodiment of the present disclosure. The manifold pressurization system 1020 is similar to the manifold pressurization system of FIG. 6 detailed above with like elements including like labels and only the differences detailed below for brevity. The manifold pressurization system 1020 has a common purge line 22 that includes a purge inlet 30, a pneumatic intensifier 42, and a control valve 50.

The pneumatic intensifier 42 receives purge air from the common purge line 22 and increases a pressure of the purge air to a purge pressure before supplying the purge air to the control valve 50. The pneumatic intensifier 42 may receive purge air above atmospheric pressure but below the purge pressure, e.g., a pressure greater than or equal to a pressure of exhaust gasses in the combustion chamber 126. By receiving pressure above atmospheric pressure, the pneumatic intensifier 42 may be smaller and require less power to operate than a pneumatic intensifier receiving air at atmospheric pressure and increasing the received air to purge pressure.

The controller 80 may control the pneumatic intensifier 42 to provide purge air to the control valve 50 at purge pressure. The controller 80 may be in electrical or wireless communication with a pressure sensor 38 to receive a pressure of air within the common purge line 22 upstream of the pneumatic intensifier 42 and may receive a pressure within the combustion chamber, e.g., from a sensor within the combustion chamber 126 or another controller. When the pressure of air within the common purge line 22 is less than the pressure within the combustion chamber 126, the controller 80 controls the pneumatic intensifier 42 to increase a pressure of the purge air to a purge pressure which is equal to or greater than a pressure within the combustion chamber 126.

The manifold pressurization systems detailed herein, e.g., manifold pressurization systems 20, 1020, are configured to pressurize an unused fuel manifold circuits to prevent backflow of exhaust gases and/or fuel therein. The purge pressure may be substantially equal to the pressure within the combustion chamber 126 such that the fuel manifold circuit receiving the purge air is in a hydrostatic state with the combustion chamber 126 to prevent backflow from the combustion chamber 126 into the respective fuel manifold circuit. Preventing backflow may prevent particulates and/or other substances within the exhaust gases from entering and damaging the unused manifold circuits. Preventing backflow may also prevent fuel from the used fuel manifold circuit from entering the unused fuel manifold circuit which may prevent damage to the unused fuel manifold circuit. An additional use of this pneumatic purge is to dispel residual fuels from the turbine manifolds in an attempt to clean these manifold from dirt ingress and combustion bi-products. When the purge pressure is greater than a pressure within the combustion chamber 126, purge air may flow from the unused manifold circuit into the fuel manifolds 210 and/or the combustion chamber 126.

Figure 9:
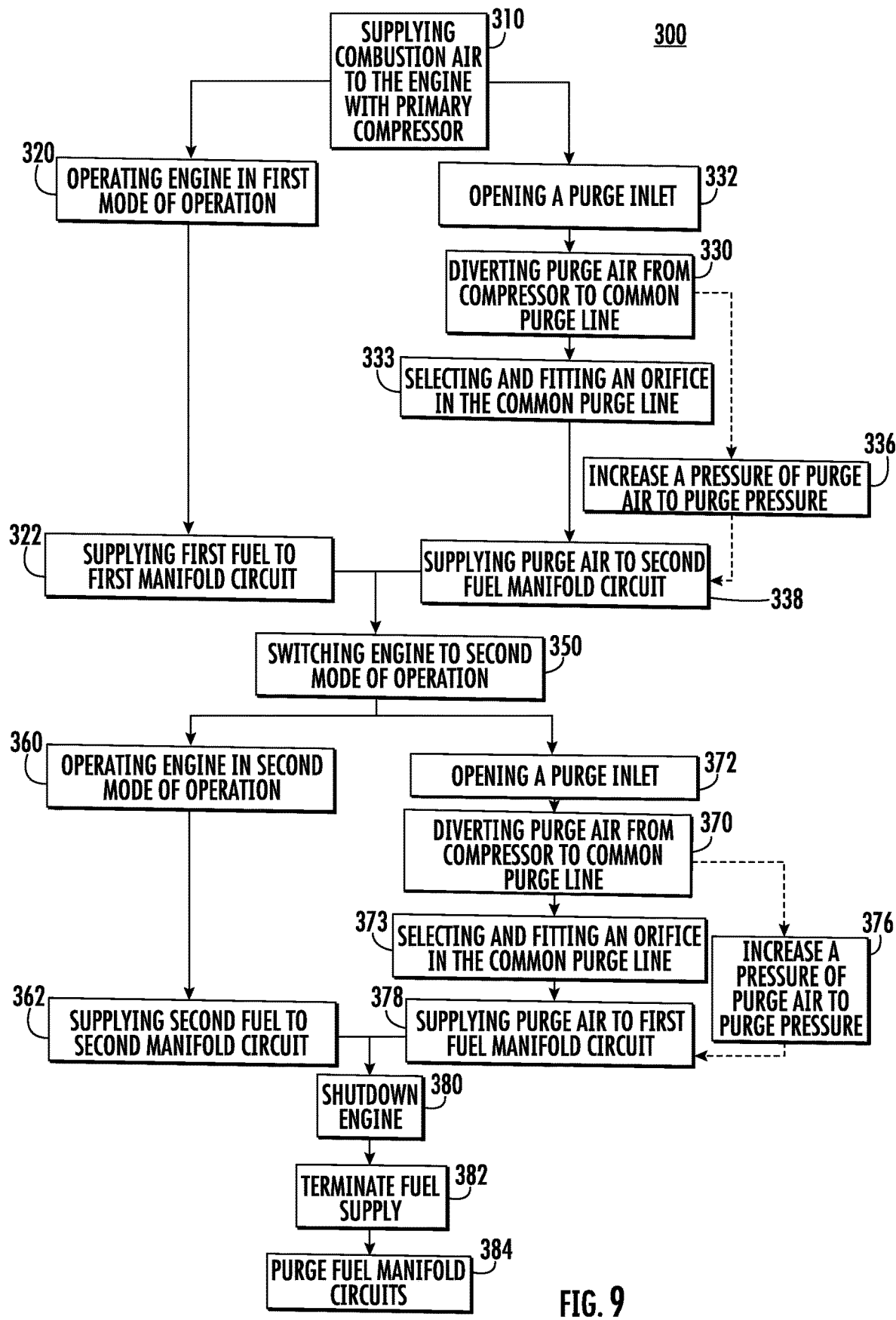
FIG. 9 is a flowchart illustrating a method of operating an engine according to embodiments of the present disclosure.

FIG. 9 illustrates a method of operating a dual fuel engine in accordance with an embodiment of the present disclosure and is referred to generally as method 300. The method 300 will be detail with respect to the engine 120, the fuel delivery circuits 200, and the manifold pressurization systems 20, 1020 of FIGS. 1-8. The method 300 is initiated with the functioning of the primary compressor 124, e.g., spinning of the primary compressor 124, such that the primary compressor 124 supplies combustion air to the combustion chamber 126 of the engine 120 (Step 310).

As shown, the method 300 is initiated with the operation of the engine 120 in a first mode of operation (Step 320) such that the engine 120 is operating on a first fuel, e.g., liquid fuel. During the first mode of operation of the engine 120, the method 300 includes supplying the first fuel to the combustion chamber 126 via a first fuel manifold circuit 212 (Step 322). When the engine 120 is operated in the first mode of operation, air is diverted into a common purge line 22 from the primary compressor 124 of the engine 120 (Step 330). Diverting the purge air may include controlling a position of a valve of a purge inlet 30 in response to a pressure within the common purge line 22 (Step 332). The method 300 may include selecting a fixed orifice 34 based on a pressure of the primary compressor 124 (Step 333). The selected fixed orifice 34 may be fitted into the common purge line 22 to limit a volume of air diverted from the primary compressor 124. The fixed orifice may be selected from a plurality of fixed orifices having a size or an opening in a range of 1/64 of an inch to 1/4 of an inch. Fitting the fixed orifice 34 may include positioning the fixed orifice 34 in a housing positioned in the common purge line 22. The method may include adjusting a variable orifice 34 to limit a volume of air diverted from the primary compressor 124.

The purge air may pass through a pneumatic intensifier 42 such that the pneumatic intensifier 42 increases a pressure of the purge air within the common purge line 22 to the purge pressure before the purge air is supplied to the control valve 50 (Step 336). A controller 80 of the engine 120 and/or the manifold pressurization system 20, 1020 may receive a signal from a pressure sensor 38 that provides a pressure of the purge air within the common purge line 22 upstream of the pneumatic intensifier 42. The controller 80 may also receive a signal indicative of a pressure within the combustion chamber 126. The controller 80 may provide a signal to the pneumatic intensifier 42 to increase a pressure of the purge air to a desired purge pressure in response to a pressure of the purge air upstream of the pneumatic intensifier 42 and/or a pressure within the combustion chamber 126.

The purge air flows through the common purge line 22 to a control valve 50. The control valve 50 may be positioned in a first position when the engine 120 is in the first mode of operation such that the purge air flows into the second fuel manifold circuit 214 at a purge pressure that is equal to or greater than a pressure within the combustion chamber 126 (Step 338). The purge air fills the second fuel manifold circuit 214 downstream of the distribution block 250 such that exhaust gasses from the combustion chamber 126 are prevented from entering the second fuel manifold circuit 214. When the purge air is at a pressure greater than the exhaust gasses within the combustion chamber 126, purge air may flow from the second fuel manifold circuit 214 into the fuel manifolds 210 and/or the combustion chamber 126.

When the engine 120 is operating in the first mode of operation, the engine 120 may be switched to a second mode of operation (Step 350). The mode of the operation of the engine 120 may be the results of an operating interfacing with a control interface of the mobile power unit 100. In some embodiments, the mode of operation of the engine 120 may result from a signal generated by the mobile power unit 100. For example, the mode of operation of the engine 120 may result from a property of field gas. Specifically, when field gas of sufficient quality is providing, the mobile power unit 100 may send a signal to switch from the first mode of operation to the second mode of operation. Alternatively, when field gas is below a required quality, the mobile power unit 100 may send a signal to switch from the second mode of operation to the first mode of operation. While the switch from the first mode of operation to the second mode of operation of the engine 120 is detailed herein, one skilled in the art would recognize that the method 300 may also include switching the engine 120 from the second mode of operation to the first mode of operation. As detailed herein, the switching of the mode of operation of the engine 120 is considered an on-the-fly fuel switch, as understood by one skilled in the art.

In the second mode of operation of the engine 120 (Step 360), the combustion chamber of the engine 120 is supplied with a second fuel via a second fuel manifold circuit 214 (Step 362). The second fuel may be a gaseous fuel. When the engine 120 is operated in the second mode of operation, air from the primary compressor 124 is diverted into a common purge line 22 from the primary compressor 124 of the engine 120 (Step 370). Diverting the purge air may include controlling a position of a purge inlet 30 in response to a pressure within the common purge line 22 (Step 372). The method 300 may include selecting a fixed orifice 34 based on a pressure of the primary compressor 124 (Step 373).

The purge air may pass through a pneumatic intensifier 42 such that the pneumatic intensifier 42 increases a pressure of the purge air within the common purge line 22 to the purge pressure before the purge air is supplied to the control valve 50 (Step 376). Step 376 is similar to step 336 detailed above and will not be detailed herein for brevity.

The purge air flows through the common purge line 22 to a control valve 50. The control valve 50 may be positioned in a second position when the engine is in the second mode of operation such that the purge air flows into the first fuel manifold circuit 212 at a purge pressure that is equal to or greater than a pressure within the combustion chamber 126 (Step 378). The purge air fills the first fuel manifold circuit 214 downstream of the tee 264 such that exhaust gasses from the combustion chamber 126 are prevented from entering the first fuel manifold circuit 212. When the purge air is at a pressure greater than the exhaust gasses within the combustion chamber 126, purge air may flow from the first fuel manifold circuit 212 into the fuel manifolds 210 and/or the combustion chamber 126.

When the engine 120 is operating in the second mode of operation, the engine 120 may be shutdown (Step 380). Shutting down the engine 120 may include terminating fuel flow into the first and second fuel manifold circuits 212, 214 (Step 382). After the fuel flow is terminated, first and second fuel manifold circuits 212, 214 may be purged with purge air (Step 384). Purging the first and second fuel manifold circuits 212, 214 may include switching the control valve 50 between the first and second positions thereof such that purge air alternates between flowing through the first and second fuel manifold circuits 212, 214. Purging the first and second fuel manifold circuits 212, 214 after fuel flow is terminated may expel residual fuel from the fuel manifold circuits 212, 214.

The manifold pressurization systems detailed herein allow for the manifold pressurization systems to be housed inside an enclosure of the engine 120 which may result in a more compact package for the mobile power unit 100. For example, when the transportation platform 110 is a trailer, the manifold pressurization systems detailed herein may allow for the trailer gooseneck being left with more space for other component sections by eliminating or reducing space required for a pressure intensifier and/or an air storage tank.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed:

1. A manifold pressurization system comprising:
   a purge inlet configured to receive purge air from a compressor of a dual fuel engine positioned to operate on a liquid fuel and a gaseous fuel;
   a common purge line connected at an upstream end to the purge inlet, the common purge line configured to provide the purge air at a purge pressure and including 1) one or more backflow prevention valves configured to prevent backflow within the common purge line, and 2) a pneumatic intensifier configured to increase the purge pressure of the purge air;
   a first purge line connected at a downstream end thereof to a manifold of the dual fuel engine via a first fuel circuit, the first fuel circuit connected to a supply of the liquid fuel;
   a second purge line connected at a downstream end thereof to the manifold via a second fuel circuit, the second fuel circuit connected to a supply of the gaseous fuel; and
   a control valve connected to a downstream end of the common purge line, an upstream end of the first purge line, and an upstream end of the second purge line, the control valve having a first position in which the control valve connects the common purge line with the second purge line such that the supply of the liquid fuel is in fluid communication with the purge air at the manifold, thereby to prevent backflow from the manifold into the second fuel circuit, and the control valve having a second position in which the control valve connects the common purge line with the first purge line such that the supply of the gaseous fuel is in fluid communication with the purge air at the manifold, thereby to prevent backflow from the manifold into the first fuel circuit;
   wherein the one or more backflow prevention valves are upstream of the pneumatic intensifier; and
   wherein the common purge line includes a pressure sensor configured to provide a signal indicative of a pressure of the common purge line, and the manifold pressurization system further comprising a control system configured to receive the signal from the pressure sensor and control a position of the purge inlet in response to the signal from the pressure sensor.

2. The system according to claim 1, wherein the common purge line includes an orifice, the orifice configured to limit a volume of the purge air within the common purge line.

3. The system according to claim 2, wherein the orifice is a fixed orifice.

4. The system according to claim 3, wherein the fixed orifice has size in a range of 1/64 to 1/4 of an inch.

5. The system according to claim 3, wherein the fixed orifice is replaceably received within an orifice fitting such that a size of the fixed orifice is variable.

6. The system according to claim 1, wherein the common purge line includes a plenum configured to store the purge air.

7. The system according to claim 1, wherein the control valve has a third position in which control valve closes the downstream end of the common purge line, the upstream end of the first purge line, and the upstream end of the second purge line.

8. The system according to claim 1, wherein the purge inlet is positioned at a P3 point of the compressor.

9. The system according to claim 1, wherein the position of the purge inlet has a closed position in which the purge air is prevented from entering the common purge line and an open position in which the purge air is allowed to enter the common purge line.

10. The system according to claim 1, wherein the dual fuel engine operates on one or more of gasoline, natural gas, well gas, field gas, or diesel.

11. A method of operating a dual fuel engine positioned to operate on a liquid fuel and a gaseous fuel, the method comprising:
supplying a first fuel to a combustion chamber of the dual fuel engine through a manifold and a first fuel circuit when no fuel is supplied to the manifold through a second fuel circuit such that the dual fuel engine is in a first mode of operation;
switching the dual fuel engine to a second mode of operation such that a second fuel is supplied to the combustion chamber through the manifold and the second fuel circuit when no fuel is supplied to the manifold through the first fuel circuit;
supplying combustion air to the combustion chamber with a primary compressor of the dual fuel engine;
diverting purge air from the primary compressor into a common purge line including 1) one or more backflow prevention valves configured to prevent backflow within the common purge line, and 2) a pneumatic intensifier configured to increase the purge pressure of the purge air from the primary compressor of the dual fuel engine through a purge inlet during operation of the dual fuel engine, the purge air being separated from the combustion air before the combustion chamber;
positioning a directional control valve in a first position when the dual fuel engine is in the first mode of operation such that the purge air flows into the manifold via the second fuel circuit at a purge pressure equal to or greater than a pressure within the combustion chamber such that backflow from the combustion chamber into the second fuel circuit is prevented; and
positioning the directional control valve in a second position when the dual fuel engine is in the second mode of operation such that the purge air flows into the manifold via the first fuel circuit at a purge pressure equal to or greater than a pressure within the combustion chamber such that backflow from the combustion chamber into the first fuel circuit is prevented;
wherein the one or more backflow prevention valves are upstream of the pneumatic intensifier; and
wherein the common purge line includes a pressure sensor configured to provide a signal indicative of a pressure of the common purge line, and the dual fuel engine further comprising a control system configured to receive the signal from the pressure sensor and control a position of the purge inlet in response to the signal from the pressure sensor.

12. The method according to claim 11, further comprising selecting a fixed orifice based on a pressure of the primary compressor; and
fitting the fixed orifice in the common purge line to limit a volume of the purge air diverted from the primary compressor.

13. The method according to claim 12, wherein selecting the fixed orifice includes selecting a fixed orifice in a range of 1/64 to 1/4 of an inch.

14. The method according to claim 11, wherein diverting the purge air from the primary compressor includes diverting the purge air from a P3 point of the primary compressor.

15. The method according to claim 11, wherein supplying the first fuel to the combustion chamber includes supplying the liquid fuel to the combustion chamber through the manifold and the first fuel circuit.

16. The method according to claim 15, wherein supplying the second fuel to the combustion chamber includes supplying the gaseous fuel to the combustion chamber through the manifold and the second fuel circuit.

17. The method according to claim 11, further comprising driving a hydraulic fracturing pump with the dual fuel engine, the hydraulic fracturing pump and the dual fuel engine mounted to a mobile trailer.

18. The method according to claim 11, wherein the dual fuel engine operates on one or more of gasoline, natural gas, well gas, field gas, or diesel.

19. A manifold pressurization system comprising:
a purge inlet configured to receive purge air from a compressor of a dual fuel engine positioned to operate on a liquid fuel and a gaseous fuel;
a common purge line connected at an upstream end to the purge inlet, the common purge line configured to provide the purge air at a purge pressure and including 1) one or more backflow prevention valves configured to prevent backflow within the common purge line, and 2) a pneumatic intensifier configured to increase the purge pressure of the purge air, wherein a position of the purge inlet has a closed position in which the purge air is prevented from entering the common purge line and an open position in which the purge air is allowed to enter the common purge line;
a first purge line connected at a downstream end thereof to a manifold chamber of the dual fuel engine via a first fuel circuit;
a second purge line connected to at a downstream end thereof to the manifold chamber via a second fuel circuit; and
a control valve connected to a downstream end of the common purge line, an upstream end of the first purge line, and an upstream end of the second purge line, the control valve having a first position in which the control valve connects the common purge line with the second purge line, thereby to prevent backflow from the manifold chamber into the second fuel circuit, and the control valve having a second position in which the control valve connects the common purge line with the first purge line, thereby to prevent backflow from the manifold chamber into the first fuel circuit;

wherein the one or more backflow prevention valves are upstream of the pneumatic intensifier;

wherein the common purge line includes a pressure sensor configured to provide a signal indicative of a pressure of the common purge line, and the manifold pressurization system further comprising a control system configured to receive the signal from the pressure sensor and control the position of the purge inlet in response to the signal from the pressure sensor.

20. The system according to claim 19, wherein the dual fuel engine operates on one or more of gasoline, natural gas, well gas, field gas, or diesel.

* * * * *